US012711853B2

(12) United States Patent
Duer

(10) Patent No.: US 12,711,853 B2
(45) Date of Patent: Aug. 18, 2026

(54) DEVICES, SYSTEMS, AND METHODS FOR HAZARD AVOIDANCE

(71) Applicant: CSAA Insurance Services, Inc., Walnut Creek, CA (US)

(72) Inventor: Anthony Duer, Concord, CA (US)

(73) Assignee: CSAA Insurance Services, Inc., Concord, CA (US)

( * ) Notice: Subject to any disclaimer, the term of this patent is extended or adjusted under 35 U.S.C. 154(b) by 0 days.

(21) Appl. No.: 18/890,371

(22) Filed: Sep. 19, 2024

(65) Prior Publication Data

US 2025/0252843 A1 Aug. 7, 2025

Related U.S. Application Data

(60) Provisional application No. 63/584,279, filed on Sep. 21, 2023.

(51) Int. Cl.

| | |
|---|---|
| ***G08B 23/00*** | (2006.01) |
| ***G08B 7/06*** | (2006.01) |
| ***G08B 21/02*** | (2006.01) |
| ***G08B 25/01*** | (2006.01) |
| ***H04W 4/029*** | (2018.01) |
| ***H04W 4/38*** | (2018.01) |
| ***H04W 4/90*** | (2018.01) |

(52) U.S. Cl.

CPC ........... *G08B 25/016* (2013.01); *G08B 7/066* (2013.01); *G08B 21/02* (2013.01); *H04W 4/029* (2018.02); *H04W 4/38* (2018.02); *H04W 4/90* (2018.02)

(58) Field of Classification Search

CPC ...... G08B 25/016; G08B 7/066; G08B 21/02; H04W 4/029; H04W 4/38; H04W 4/90

USPC ...................................................... 340/573.1

See application file for complete search history.

(56) References Cited

U.S. PATENT DOCUMENTS

| | | | | |
|---|---|---|---|---|
| 10,514,264 | B2 * | 12/2019 | Correnti | G01C 21/206 |
| 2006/0152254 | A1 * | 7/2006 | Cowles | H03K 19/0016 327/108 |
| 2021/0097311 | A1 * | 4/2021 | McBeth | G08G 1/096775 |

* cited by examiner

*Primary Examiner* — Tai T Nguyen

(74) *Attorney, Agent, or Firm* — McDonnell Boehnen Hulbert & Berghoff LLP

(57) ABSTRACT

In one aspect, an example method includes: (a) receiving geographic region data associated with a location of a wearable device; (b) collecting environmental data within the geographic region of the wearable device; (c) identifying one or more hazardous conditions within the geographic region; (d) determining an updated location of the wearable device within the geographic region; (e) determining an alert condition, wherein the alert condition comprises determining that the wearable device is within a threshold proximity to at least one area associated with a hazardous condition; and (f) selecting a computational action for alerting a user associated with the wearable device that the wearable device is within the threshold proximity to the at least one area associated with the hazardous condition.

20 Claims, 16 Drawing Sheets

Figure 5

DEVICES, SYSTEMS, AND METHODS FOR HAZARD AVOIDANCE

This application claims priority to U.S. Provisional Application No. 63/584,279, filed on Sep. 21, 2023, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example wearable device for hazard avoidance is disclosed. The example wearable device comprises: a processor and a non-transitory computer-readable medium, having stored thereon program instructions that, upon execution by the processor, cause the wearable device to perform a set of operations comprising: (a) receiving geographic region data associated with a location of the wearable device; (b) collecting environmental data within the geographic region of the wearable device; (c) identifying one or more hazardous conditions within the geographic region, wherein the one or more hazardous conditions are identified based on at least one of the received geographic region data and the collected environmental data, and wherein the one or more hazardous conditions are associated with, for each of multiple areas within the geographic region, a respective level of risk of traveling into a particular area associated with each of the hazardous conditions; (d) determining an updated location of the wearable device within the geographic region; (e) based on the identified one or more hazardous conditions within the geographic region and the determined updated location of the wearable device within the geographic region, determining an alert condition, wherein the alert condition comprises determining that the wearable device is within a threshold proximity to at least one area associated with a hazardous condition; and (f) based on the determined alert condition, selecting a computational action for alerting a user associated with the wearable device that the wearable device is within the threshold proximity to the at least one area associated with the hazardous condition, wherein the computational action is selected based on the respective level of risk of traveling within the threshold proximity to the at least one area associated with the hazardous condition.

In another aspect, a system for hazard avoidance is disclosed. In example embodiments, the example system comprises a first computing device comprising: (a) a sensor; (b) a network interface; (c) a processor; and (d) a non-transitory computer-readable medium, having stored thereon program instructions that, upon execution by the processor, cause the first computing device to perform a set of operations comprising: (i) receiving, via the network interface, geographic region data associated with a location of the first computing device; (ii) collecting, via the sensor, environmental data within the geographic region of the first computing device; (iii) identifying one or more hazardous conditions within the geographic region, wherein the one or more hazardous conditions are identified based on at least one of the received geographic region data and the collected environmental data, and wherein the one or more hazardous conditions are associated with, for each of multiple areas within the geographic region, a respective level of risk of traveling into a particular area associated with each of the hazardous conditions; and (iv) transmitting, via the network interface, data indicating the identified one or more hazardous conditions to a second computing device. In a further aspect, the example system comprises a second computing device comprising: (a) a processor; and (b) a non-transitory computer-readable medium, having stored thereon program instructions that, upon execution by the processor, cause the first computing device to perform a set of operations comprising: (i) receiving, from the first computing device, data indicating the identified one or more hazardous conditions; (ii) determining an updated location of the first computing device within the geographic region; (iii) based on the received data indicating the identified one or more hazardous conditions within the geographic region and the determined updated location of the first computing device within the geographic region, determining an alert condition, wherein the alert condition comprises determining that the first computing device is within a threshold proximity to at least one area associated with a hazardous condition; and (iv) based on the determined alert condition, selecting a computational action for alerting a user associated with the first computing device that the first computing device is within the threshold proximity to the at least one area associated with the hazardous condition, wherein the computational action is selected based on the associated level of risk of traveling within the threshold proximity to the at least one area associated with the hazardous condition.

In another aspect, an example method for hazard avoidance is disclosed. The method includes: (a) receiving geographic region data associated with a location of a wearable device; (b) collecting environmental data within the geographic region of the wearable device; (c) identifying one or more hazardous conditions within the geographic region, wherein the one or more hazardous conditions are identified based on at least one of the received geographic region data and the collected environmental data, and wherein the one or more hazardous conditions are associated with, for each of multiple areas within the geographic region, a respective level of risk of traveling into a particular area associated with each of the hazardous conditions; (d) determining an updated location of the wearable device within the geographic region; (e) based on the identified one or more hazardous conditions within the geographic region and the determined updated location of the wearable device within the geographic region, determining an alert condition, wherein the alert condition comprises determining that the wearable device is within a threshold proximity to at least one area associated with a hazardous condition; and (f) based on the determined alert condition, selecting a computational action for alerting a user associated with the wearable device that the wearable device is within the threshold proximity to the at least one area associated with the hazardous condition, wherein the computational action is selected based on the respective level of risk of traveling within the threshold proximity to the at least one area associated with the hazardous condition.

In another aspect, an example non-transitory computer-readable medium is disclosed. The computer-readable medium has stored thereon program instructions that, upon execution by a computing system, cause the computing system to perform a set of operations comprising: (a) receiving geographic region data associated with a location of a wearable device; (b) collecting environmental data within the geographic region of the wearable device; (c) identifying one or more hazardous conditions within the geographic region, wherein the one or more hazardous conditions are identified based on at least one of the received geographic region data and the collected environmental data, and wherein the one or more hazardous conditions are associated with, for each of multiple areas within the geographic region, a respective level of risk of traveling into a particular area associated with each of the hazardous conditions; (d) determining an updated location of the wearable device within the geographic region; (e) based on the identified one or more hazardous conditions within the geographic region and the determined updated location of the wearable device within the geographic region, determining an alert condition, wherein the alert condition comprises determining that the wearable device is within a threshold proximity to at least one area associated with a hazardous condition; and (f) based on the determined alert condition, selecting a computational action for alerting a user associated with the wearable device that the wearable device is within the threshold proximity to the at least one area associated with the hazardous condition, wherein the computational action is selected based on the respective level of risk of traveling within the threshold proximity to the at least one area associated with the hazardous condition.

BRIEF DESCRIPTION OF THE DRAWINGS

FIG. 5 is a flow chart of an example method.

DETAILED DESCRIPTION

Figure 1:
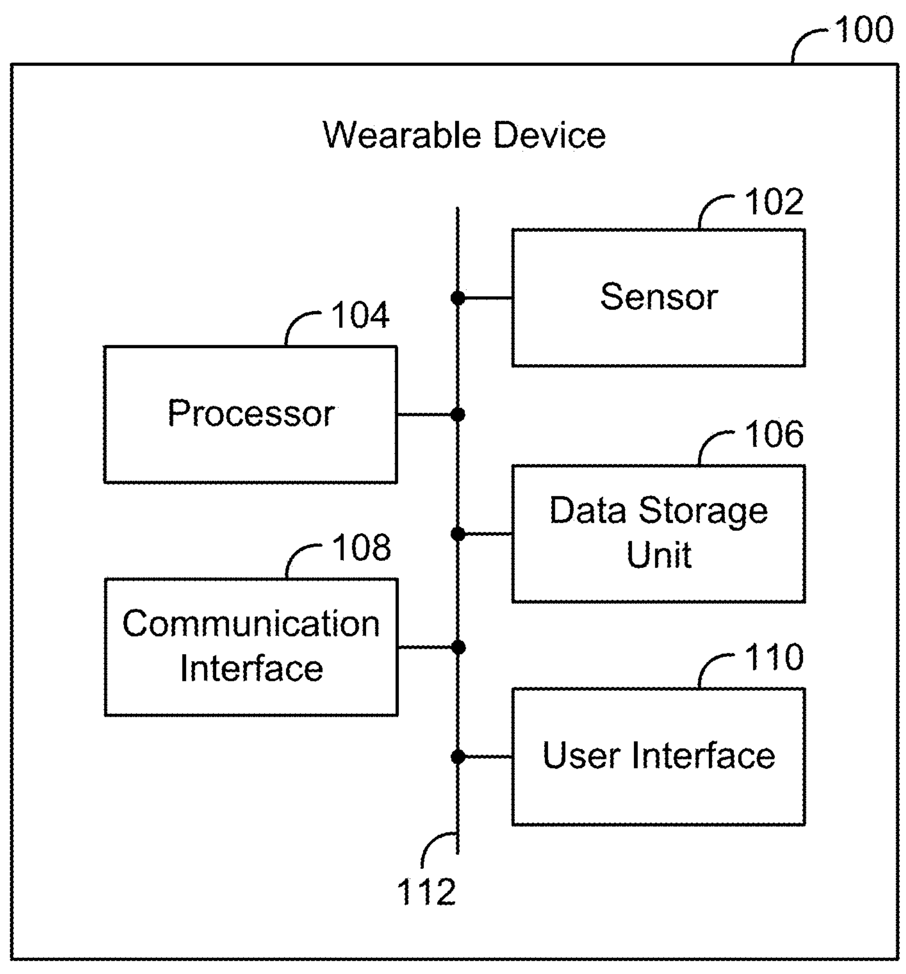
FIG. 1 is a simplified block diagram of an example computing device.

High-precision maps and localization algorithms have evolved quickly alongside the rapid pace of development for Autonomous Vehicles (AVs). However, this data has yet to be incorporated into other markets outside of the AV space, such as in hazard avoidance for children (e.g., child safety monitoring) and/or particular adults (e.g., adults with genetic, intellectual, and/or developmental disorders/disabilities), for instance. Conventionally, such safety devices include a geofence around specific locations in which the party is restricted, such as a school, a home, or a park. However, this model is not very adaptive to day-to-day situations that the party may take part in, such as walking to a friend's home or walking to/from school.

If, however, the hazard avoidance systems and associated models could provide an efficient, effective, and novel solution for assessing hazards along a party's path in real time leveraging existing and evolving high-precision mapping and localization algorithm technologies, then the overall experience and safety associated with a party traversing through any neighborhood could be more accurately forecasted, and the party themselves and/or a related party (e.g., parent, guardian, caretaker, etc.) may be alerted as to the nearing hazardous condition along the party's path.

Accordingly, features of the present disclosure can help to address these and other issues to provide an improvement to select technical fields. More specifically, features of the present disclosure help address issues within and provide improvements for select technical fields, which include for example, computer-based systems for collecting and analyzing data from high-precision maps, advanced alongside AV development, that includes indications such as where street signs, lane markings, pedestrian crossings, etc. are located within one or more geographic areas based on this data, identifying hazards in the one or more geographic areas, as well as each hazard's associated risk, and communicating with mobile computing devices, applications, and graphical user interfaces (GUIs) used by parents, guardians, and/or caretakers associated with the user of the wearable device, as well as other entities.

More specifically, example embodiments relate to methods, systems, and devices that allow a hazard avoidance system configured for use with a wearable computing device and one or more mobile computing devices to assess various potentially hazardous conditions occurring proximate to a user associated with a user of a wearable computing device and/or one or more mobile computing devices by leveraging one or more sensor technologies (e.g., in the wearable computing device, an associated mobile computing devices, other computing devices, etc.) and data associated with the wearable computing device and the one or more mobile computing devices that has been collected before the one or more potentially hazardous conditions are identified.

To facilitate this analysis, the hazard avoidance system may use one or more components to carry out various steps of this process. For example, the hazard avoidance system may include a wearable computing device (e.g., a wristwatch computing device that receives data from a number of sources and collects and/or analyzes sensors to determine whether the user is within a threshold proximity to one or more hazardous conditions) and/or a mobile computing device (e.g., a smartphone associated with a user of the wearable computing device). These computing devices can be used to perform various operational functions within the hazard avoidance system to determine and display various attributes associated with one or more potentially hazardous conditions, as well as further actions that should be undertaken by one or more users associated with the wearable computing device, the mobile computing device, or both, among other possibilities.

In one aspect, the hazard avoidance system may collect data associated with one or more hazardous conditions from one or more resources. This data may include data from public and/or private databases associated with a particular region or geolocation, as well as other resources associated with the wearable computing device and an associated mobile computing devices (e.g., sensor data from the wearable computing device, geolocation and/or map data associated with the wearable computing device and/or mobile computing devices associated with the wearable computing device, a computing device associated with the wearable computing device and/or the mobile computing devices, etc.). In some examples, this geographic region data may include one or more of: (i) map data (e.g., high-definition (HD) public map data and/or street data associated with a particular region); (ii) weather data (e.g., tornado, hurricane, and/or other emergency weather data associated with a particular region); (iii) accident data (e.g., data indicating vehicle accidents and/or other accident conditions associated with a particular region); (iv) emergency data (e.g., data indicating crime and/or other emergency conditions associated with a particular region); and (v) traffic data. In some examples, this data may also include images, videos, and other data associated with a particular region or geolocation, as well as other resources associated with the wearable computing device and/or an associated mobile computing devices (e.g., images and/or videos of a location and any associated hazardous conditions from traffic cameras, aggregated mobile computing devices, social media platforms, etc.).

In a further aspect, in example embodiments, the hazard avoidance system may collect sensor data from one or more sensors on the wearable computing device within the relevant geographic region. This sensor data may include data from one or more sensors, including: (i) GPS sensors (e.g., to determine a geographic location of the wearable device at the time of an accident); (ii) accelerometer sensors (e.g., to determine speed and/or direction of the wearer of the wearable device at the time of an accident and/or other hazardous conditions); (iii) weather sensors, (iv) sound detection sensors, and/or (v) camera sensors (e.g., to determine various aspects of the environment and/or conditions around the wearer of the wearable computing device at the time of an accident), among other possibilities. For example, the sensor data may include data from one or more sensors that indicate one or more conditions of the wearer of the wearable computing device, including: (i) biometric sensors; (ii) heartrate sensors; and/or (iii) oxygen sensors, among other possibilities.

In example embodiments, once the hazard avoidance system collects data from various resources, the hazard avoidance system may also generate and maintain one or more programs to interpret this data (e.g., one or more programs securely stored on a server and/or database associated with the hazard avoidance system, the wearer of the wearable computing device and/or a parent, guardian, and/or caretaker for the wearer of the wearable computing device). For example, the modeling computing device may use one or more machine learning models to interpret this data and generate one more models based on this collected data.

For example, the hazard avoidance system may use image and/or video data associated with the wearable computing device and/or mobile computing devices associated with the wearable computing device to utilize and/or train a predictive machine learning model to approximate and generate an hazard avoidance model that indicates a 3D scene reconstruction of one or more hazardous conditions in and around a particular geographic region from the data (e.g., map data, biometric data, etc.) collected by the hazard avoidance system. In this regard, the predictive machine learning models may allow high accuracy and dynamic virtual reconstructions of one or more potential hazards in or around a geographic region to be reconstructed and evaluated using a series of otherwise disparate and seemingly unrelated data. Once the initial predictive machine learning model is generated, the model may be trained and its accuracy may be further improved by recurrently ingesting updated data that is associated with the wearable computing device and/or mobile computing devices associated with the wearable computing device to further utilize and/or train the model, including data associated with the wearable computing device (e.g., geolocation data, heartrate data, sound data), a mobile computing device associated with the wearable computing device (e.g., image and/or video data from a caretaker's mobile computing device), and/or both, among other possibilities. For example, in an example embodiment, multiple devices may be used to capture data (e.g., sound data from a plurality of microphones in computing devices throughout a region) to further contextualize and/or supplement data collected by a single or very few devices. For example, if a dangerous event is taking place in a geographic region (e.g., an explosion), then multiple mobile computing devices (e.g., smartphones) operating in the region may be used to triangulate the location of the dangerous event, thereby providing more specific context and detail of the hazardous condition, all in a faster timeframe than existing systems. Other examples are possible.

Utilizing predictive machine learning models and other models may provide one or more distinct benefits to the hazard avoidance system, including that, rather than creating a generalized model that can be applied to any circumstance, such models can be trained and recurrently updated based on an expansive set of data, which may crowdsource, leverage, and utilize data, updating in near-real time, from any number of computing devices, including mobile computing devices (e.g., smartphones, laptop computing devices, etc.). Furthermore, although the predictive model has been detailed herein, it should be readily apparent to those of ordinary skill in the art that other machine learning models may be used in the example embodiments detailed herein.

II. Example Architecture and Operations

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a sensor 102, a processor 104, a data storage unit 106, a communication interface 108, and/or a user interface 110. Each of these components can be connected to each other via a connection mechanism 112.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The sensor 102 can include sensors now known or later developed, including but not limited to accelerometer sensors, a sound detection sensor, a motion sensor, a humidity sensor, a temperature sensor, a proximity sensor, a location sensor (e.g., a GPS sensor), time sensors (e.g., a digital clock), camera sensors (e.g., cameras on a mobile computing device), biometric sensors (e.g., heartrate sensor, oxygen sensor, fingerprint sensor), device interaction sensors (e.g., a touch screen and/or retinal scanner on a wearable computing device and/or a mobile computing device, such as a smartphone), and/or a combination of these sensors, among other possibilities.

The processor 104 can include a general-purpose processor (e.g., a microprocessor) and/or a special-purpose processor (e.g., a digital signal processor (DSP)). The processor 104 can execute program instructions included in the data storage unit 106 as discussed below.

The data storage unit 106 can include one or more volatile, non-volatile, removable, and/or non-removable storage components, such as magnetic, optical, and/or flash storage, and/or can be integrated in whole or in part with the processor 104. Further, the data storage unit 106 can take the form of a non-transitory computer-readable storage medium, having stored thereon program instructions (e.g., compiled or non-compiled program logic and/or machine code) that, upon execution by the processor 104, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 108 and/or the user interface 110. The data storage unit 106 can also store other types of data, such as those types described in this disclosure.

The communication interface 108 can allow the computing device 100 to connect with and/or communicate with another entity, such as another computing device, according to one or more protocols. In one example, the communication interface 108 can be a wired interface, such as an Ethernet interface. In another example, the communication interface 108 can be a wireless interface, such as a cellular or WI-FI interface. In this disclosure, a connection can be a direct connection or an indirect connection, the latter being a connection that passes through and/or traverses one or more entities, such as a router, switch, or other network device. Likewise, in this disclosure, a transmission can be a direct transmission or an indirect transmission.

The user interface 110 can include hardware and/or software components that facilitate interaction between the computing device 100 and a user of the computing device 100, if applicable. As such, the user interface 110 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, and/or a mobile smartphone. Additionally, as used herein, "mobile computing device" describes computing devices that are highly mobile (including a laptop, a tablet, and/or a mobile phone), as well as computing devices that are not as mobile (including a desktop computer, etc.). In a further aspect, the features described herein may involve some or all of these components arranged in different ways, including additional or fewer components and/or different types of components, among other possibilities.

Figure 2A:
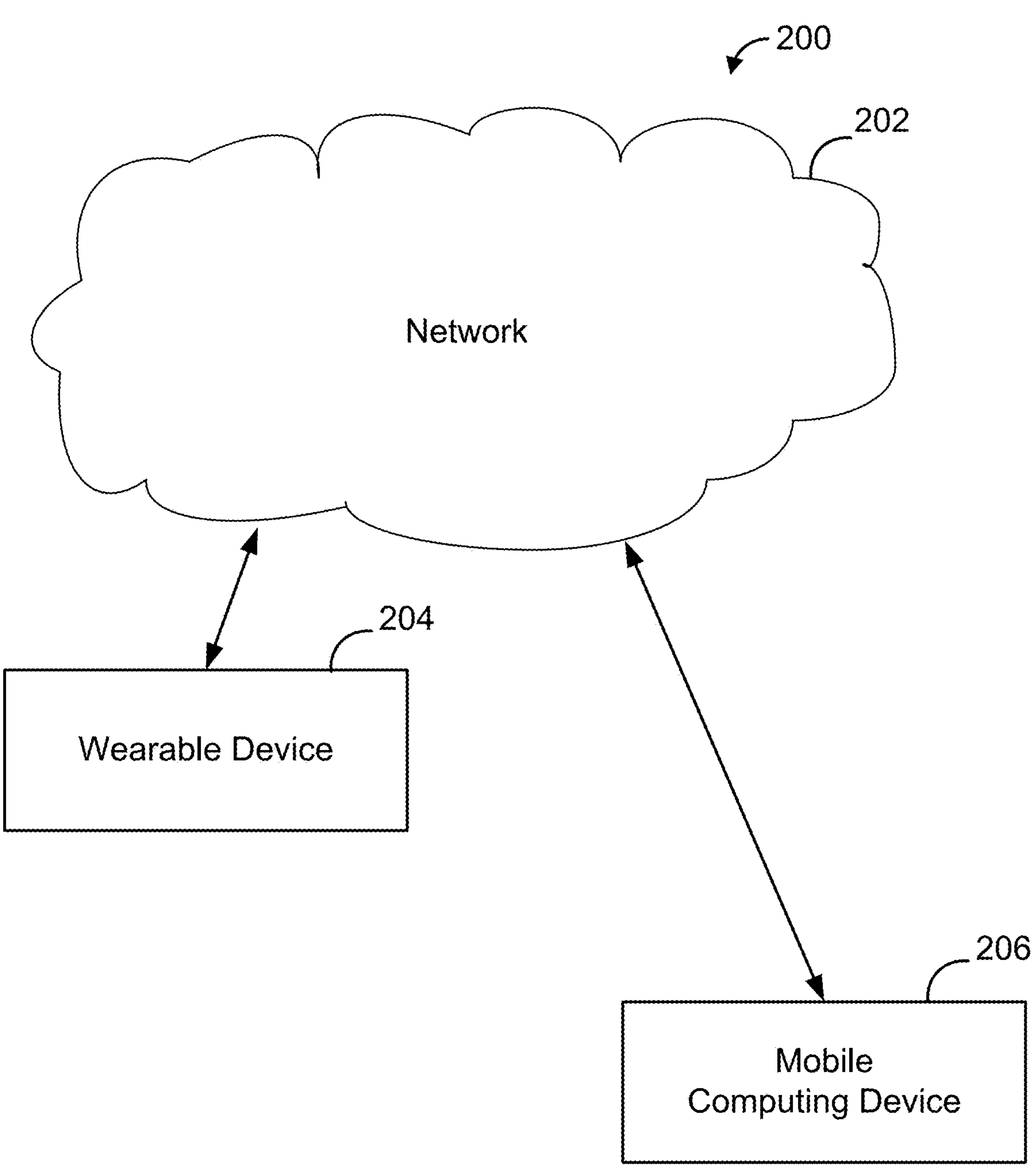
FIG. 2A is an example hazard avoidance system configured for use with a wearable computing device and a mobile computing device.

B. Hazard Avoidance System Configured for Use with a Wearable Computing Device and One or More Mobile Computing Devices FIG. 2A is an example hazard avoidance system 200 configured for use with a wearable computing device and one or more mobile computing devices. The hazard avoidance system 200 can perform various acts and/or functions related to collecting sensor data from one or more sources (e.g., a wearable computing device, one or more mobile computing devices, etc.), video and/or image data of the user of the wearable computing device and/or one or more mobile computing devices, and/or data associated with the wearable computing device and/or one or more mobile computing devices to evaluate potential hazards for a user of the wearable computing device and/or one or more mobile computing devices and take one or more responsive actions to address the potential hazards, and can be implemented as a computing system.

In this disclosure, the term "computing system" means a system that includes at least one computing device, such as computing device 100. In some instances, a computing system can include one or more other computing systems. It should also be readily understood that computing device 100, hazard avoidance system 200, and any of the components thereof, can be physical systems made up of physical devices, cloud-based systems made up of cloud-based devices that store program logic and/or data of cloud-based applications and/or services (e.g., for performing at least one function of a software application or an application platform for computing systems and devices detailed herein), or some combination of the two.

In any event, the hazard avoidance system 200 can include various components, such as a network 202 (shown here as a cloud-based computing device and/or server), a wearable device 204, and a mobile computing device 206, each of which can be implemented as a computing system or part of a computing system. The hazard avoidance system 200 can also include connection mechanisms (shown here as lines with arrows at each end (i.e., "double arrows"), which connect network 202, wearable device 204, and a mobile computing device 206, and may do so in a number of ways (e.g., a wired mechanism, wireless mechanisms and communication protocols, etc.).

Other computational actions, displayed messages, audible alerts, visual alerts, and configurations are possible. The hazard avoidance system 200 and/or components thereof can perform various acts and/or functions (many of which are described above). Examples of these and related features will now be described in further detail.

Within hazard avoidance system 200, network 202 may collect data from a number of sources within a geographic region.

In one example, network 202 may collect data from wearable device 204. In other embodiments, network 202 may collect data from a number of sources external to wearable device 204, such as one or more vehicle sensors on one or more vehicles operating within the geographic region, one or more stationary sensors within the geographic region (e.g., infrastructure sensors, security camera footage, cameras on street intersections, or the like). This external sensor data may include data from one or more of the following sensors operating within the geographic region: (i) GPS sensors; (ii) accelerometer sensors; (iii) weather sensors; (iv) collision sensors; and (v) camera sensors, among other possibilities.

In another example, network 202 may collect data from one or more environment sensors collecting data in and/or otherwise indicating information about the geographic region. This environment sensor data may include data from one or more of the following, and or all of which may be located on devices within and/or outside of the geographic region: (i) weather data; (ii) traffic data; (iii) accident data; (iv) time data; (v) map data; (vi) road condition data; and (vii) camera data, among other possibilities.

In another example, network 202 may collect data from other wearable devices worn by other users than wearable device 204. For instance, network 202 may collect data from all wearable devices within a specific geographic region.

In yet another example, network 202 may collect data from one or more mobile computing devices (e.g., mobile computing device 206) within the geographic region. In a further aspect, these one or more mobile computing devices may include a mobile computing device associated with the user of the wearable device 204, mobile computing device 206 associated with a guardian responsible for the user of the wearable device 204, or both, among other possibilities. The data collected from these mobile computing devices may include operational data from one or more of the following sensors of the mobile computing device and/or vehicle operating within the geographic region: (i) GPS sensors; (ii) accelerometer sensors; (iii) device interaction sensor; (iv) time sensor; (v) weather sensors; (vi) collision sensors; and (vii) camera sensors, among other possibilities.

Figure 2B:
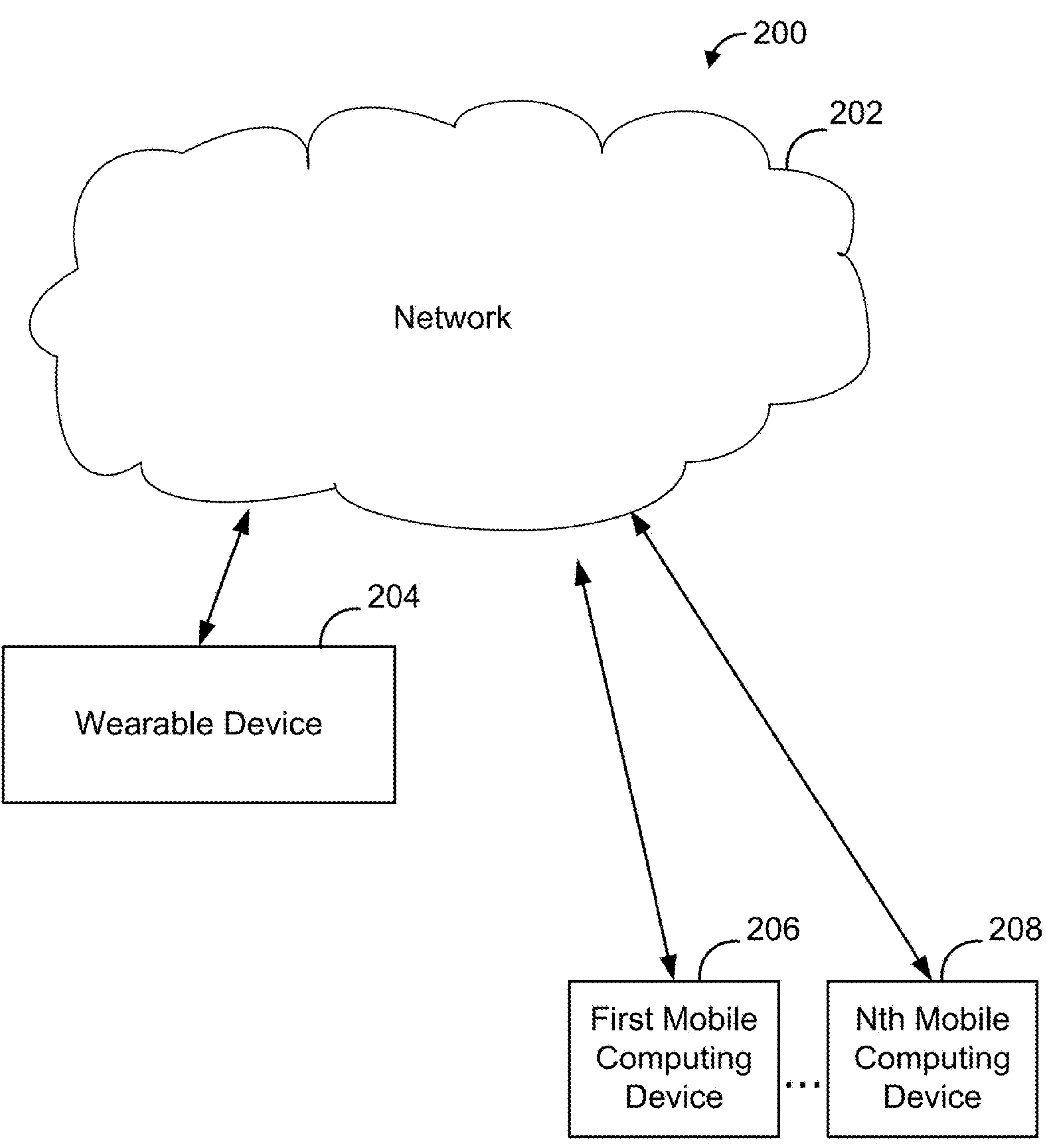
FIG. 2B is an example hazard avoidance system configured for use with a wearable computing device and multiple mobile computing devices.

For instance, as shown in FIG. 2B, in yet another example, network 202 may collect data from one or more mobile computing devices within the geographic region. Similar to FIG. 2A, the hazard avoidance system illustrated in FIG. 2B can include various components, such as a network 202 (shown here as a cloud-based computing device and/or server), wearable device 204, one or more mobile computing devices (shown here as a first mobile computing device 206 up to an Nth environment sensor 208), each of which can be implemented as a computing system or part of a computing system.

In practice, the hazard avoidance system 200 illustrated in FIG. 2B is likely to include many of some or all of the example components described above in FIG. 2A. For example, within hazard avoidance system 200, network 202 may collect data from a number of sources within a geographic region, thereby crowdsourcing sensor data and other types of data within a geographic region. In turn, in example embodiments, this crowdsourced data may be utilized to make more accurate and timely analyses of identifying hazardous conditions within the geographic regions and providing updates to one or more users of the wearable devices within the geographic region and/or one or more computing devices associated with the wearable devices within the geographic region.

In some embodiments, wearable device 204 may be linked through network 202 to multiple mobile computing devices. For instance, a user (e.g., a child) associated with wearable device 204 may be linked through network 202 with a first mobile computing device 206 associated with the mother of the child. However, the same user may be linked from wearable device 204 through network 202 with a second mobile computing device (e.g., associated with the father of the child), a third mobile computing device (e.g., associated with a teacher of the child at the nearby school), a fourth mobile computing device (e.g., associated with another relative of the child), and/or a fifth mobile computing device (e.g., associated with a trusted neighbor of the child). Other trusted associations to the child may also be connected through network 202 to their respective mobile computing devices.

In other embodiments, a plurality of wearable devices may be in communication with network 202 such that, as data gets updated at network 202, the plurality of wearable devices in communication with network 202 may be simultaneously updated (i.e., alerting any wearable device in a particular geographic region connected to network 202 of a localized event in near-real time, such as police activity, construction, obstructions, or the like). Further, multiple wearable devices may be linked through network 202 to a mobile computing device, such as first mobile computing device 206, or a plurality of mobile computing devices associated with the users of the multiple wearable devices (e.g., multiple children from the same family each associated with their own wearable device such that an authorized viewer such as a parent may receive updates through network 202 for each individual child from their differing wearable devices).

Similarly, in some embodiments, all authorized users having their own mobile computing device connected to network 202 may receive alerts from every user of multiple wearable devices within a threshold geographic region through network 202 (e.g., an authorized math teacher and an authorized English teacher at the school may receive alerts on their respective mobile computing devices for each of their students associated with individual wearable devices when the students are within a threshold geographic region of the school). In some embodiments, an authorized neighbor may similarly receive updates from one or more neighborhood children associated with their own wearable devices when each of the neighborhood kids are within a threshold geographic region of the neighbor's mobile computing device location. In example embodiments, performing these operations ad alerting the nearest authorized viewer to the user of the wearable device of a hazard near the user of the wearable device may provide improved systems and methods to quickly prevent the user of the wearable device from accessing the hazard in the environment.

Turning to FIGS. 3A-3K, the example embodiments shown in FIGS. 3A-3K depict an example graphical user interface 300 in various states. Graphical user interface 300 includes visual representations that notify the user of the wearable device for hazard avoidance, an associated user of a computing device associated with the user of the wearable device for hazard avoidance, or both that there are potential hazards in the path of the user of the wearable device. In some embodiments, the potential hazards in the path of the user of the wearable device may include visual indications of the hazard and associated risk levels depicted on graphical user interface 300 associated with the one or more routes and/or various actions that may be taken in response to the detected information. In some embodiments, graphical user interface 300 may be on a wearable device configured to be worn by the user, such as the wearable device 204 in FIGS. 2A-2B. In other embodiments, graphical user interface 300 may be on one or more mobile computing devices, such as the mobile computing device 206 in FIGS. 2A-2B. In other embodiments, graphical user interface 300 may be on both a wearable device configured to be worn by the user and one or more mobile computing devices of associated users with the user of the wearable device.

Figure 3A:
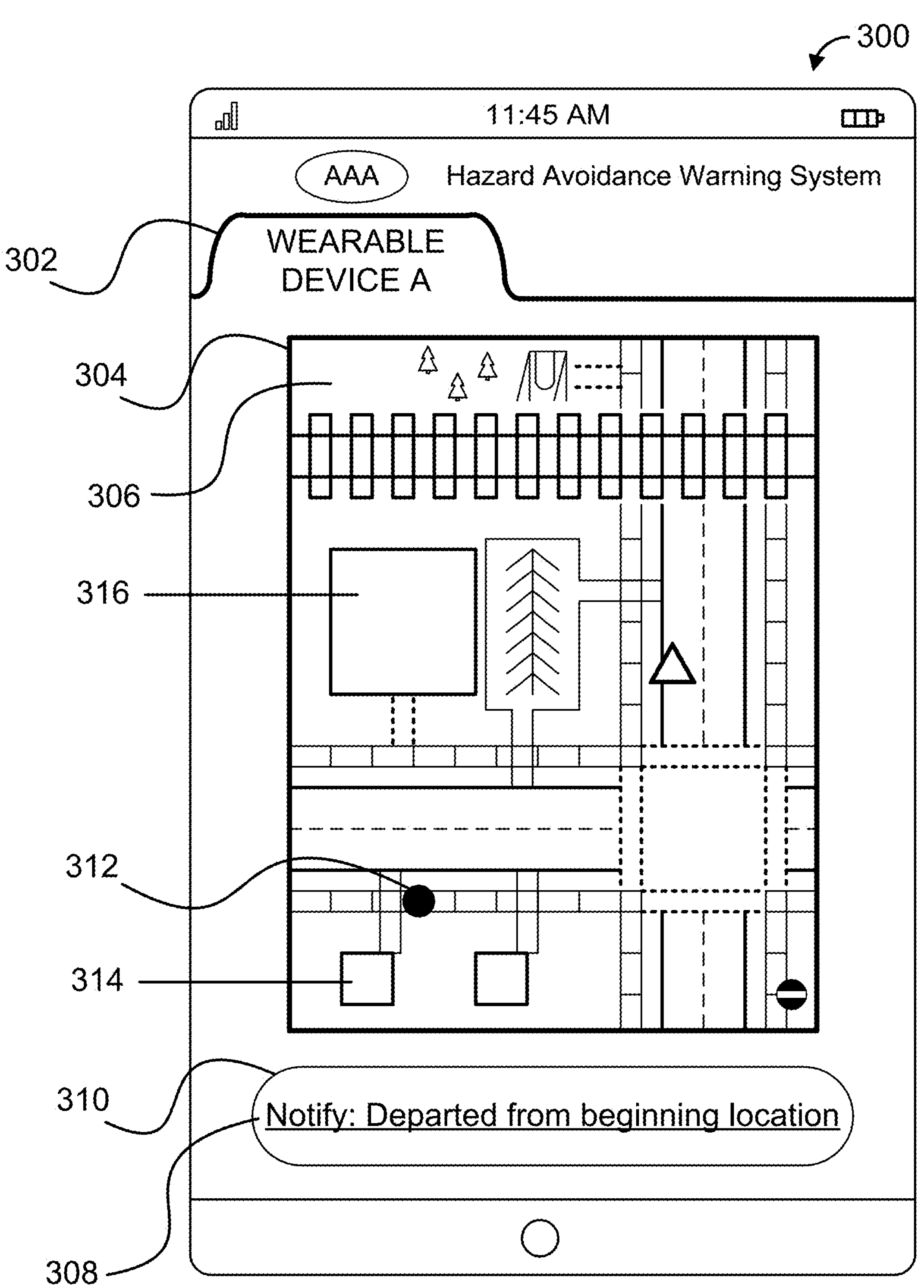
FIG. 3A is an example mobile device of an example hazard avoidance system and graphical user interface in a first state.

As shown in FIG. 3A, graphical user interface 300 receives geographic region data associated with a location of the wearable device A and displays a graphical representation 302 associated with the location of the wearable device A, including the received geographic data as a map 306 on display portion 304 of graphical user interface 300. Graphical user interface 300 also receives environmental data associated with a location of the wearable device A 302 and displays the received geographic data on the map 306 on display portion 304 of graphical user interface 300. Based on the received data, graphical user interface 300 displays the map 306, including one or more identified hazardous conditions within the geographic region based on at least one of the received geographic region data and the collected environmental data. In some embodiments, the one or more hazardous conditions are associated with, for each of multiple areas within the geographic region, a respective level of risk of traveling into a particular area associated with each of the hazardous conditions.

Graphical user interface 300 also includes a notification display region 310 for displaying one or more messages 308 to the user of the wearable device for hazard avoidance, an associated user of a computing device associated with the user of the wearable device for hazard avoidance, or both. The alert conditions can be sent in any way to any number of associated mobile computing devices, as is described in FIGS. 2A-2B. For example, in FIG. 3A, the alert condition shown as message 308 in notification display region 310 of graphical user interface 300 reads "Notify: Departed from beginning location." The alert condition shown as message 308 indicates to the intended recipients the status of the user of wearable device A 202 in real time or near real time. In other embodiments, more than one wearable device may be linked to the associated mobile computing devices in a similar manner.

FIGS. 3A-3K show graphical user interface 300 on a mobile computing device in an example scenario. The user of the wearable device (user 312) is meant to be monitored by a user associated with the user of the wearable device (e.g., a parent of a child wearing the wearable device) on the mobile computing device as user 312 walks from a first location 314 (e.g., his/her house) to a second location 316 (e.g., his/her school). As user 312 navigates the environment within the geographic region, different alerts and alert conditions may be displayed as one or more messages 308 in notification display region 310 of graphical user interface 300. Similarly, the wearable device may simultaneously alert user 312 in a variety of ways as user 312 navigates within the environment.

Figure 3B:
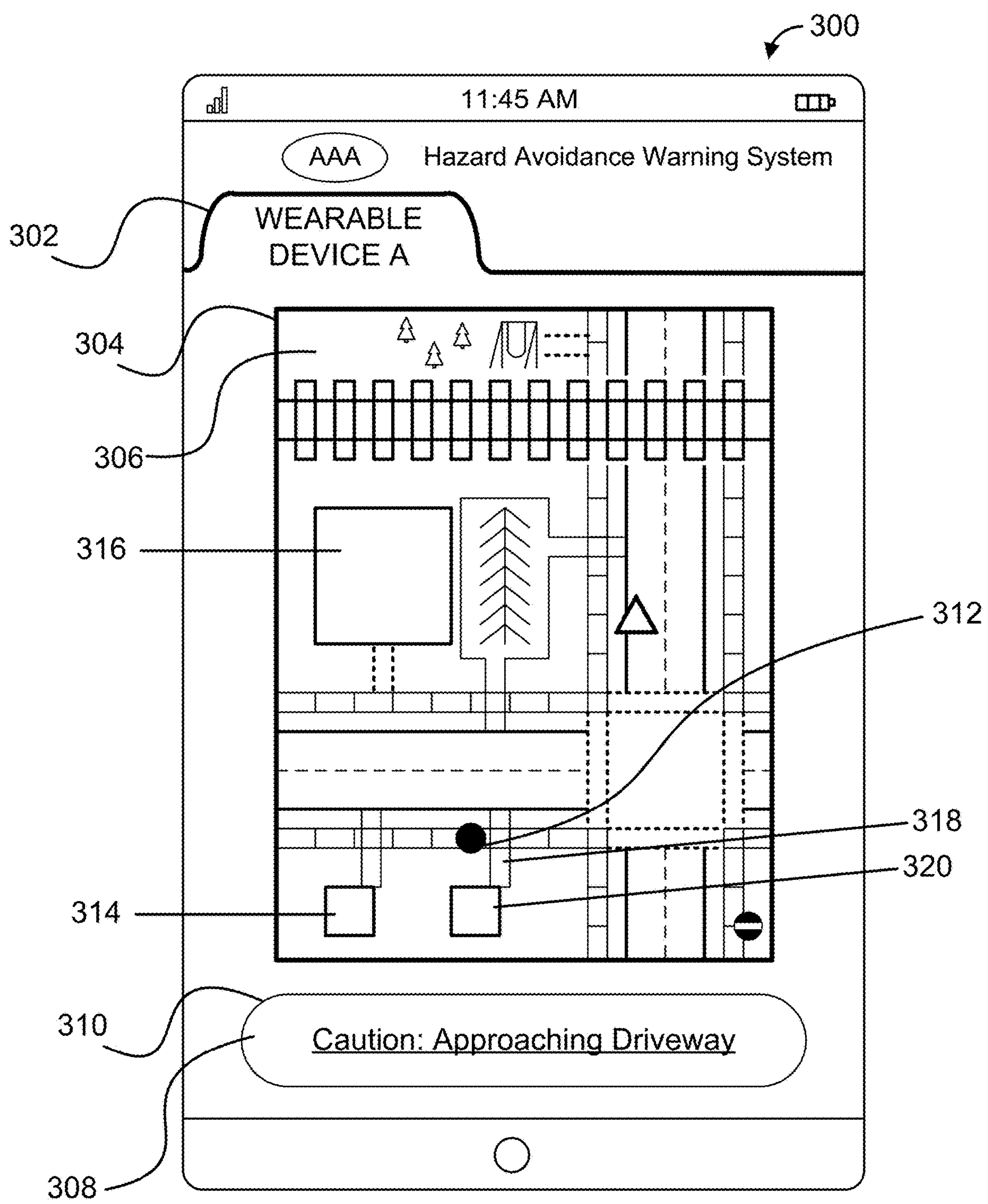
FIG. 3B is the example mobile device of the accident hazard avoidance system and graphical user interface of FIG. 3A, but in a second state.

As user 312 begins to walk, an updated location of user 312 within the geographic region is displayed on graphical user interface 300. For instance, as shown in FIGS. 3A-3B, user 312 begins walking on the sidewalk on the same side of the street as the user's first location 314. Based on the identified one or more hazardous conditions within the geographic region and the determined updated location of the wearable device within the geographic region, such as driveway 318 of neighbor's house 320, graphical user interface 300 displays an alert condition to the parent on the mobile computing device. The alert condition is an indication of a determination that the wearable device is within a threshold proximity to at least one area associated with a hazardous condition. In some embodiments, the alert condition is determined based on the level of risk associated with the hazardous condition. As such, the alert condition could be a notification alert for a low level of risk below a predetermined first threshold level, a caution alert for a medium level of risk above the predetermined first threshold level but below a predetermined second threshold level, or an urgent alert for a high level of risk above the second threshold level. Other notification conditions are also possible. For instance, user 312 approaching driveway 318 of neighbor's house 320 may be associated with a medium level of risk, and the alert condition shown as message 308 in notification display region 310 of graphical user interface reads "Caution: Approaching Driveway."

In addition, simultaneously or subsequently, based on the determined alert condition, user 312 may be notified through wearable device that user 312 is within the threshold proximity to the at least one area associated with the hazardous condition. The notification through wearable device on user 312 may be selected based on the respective level of risk of traveling within the threshold proximity to the at least one area associated with the hazardous condition. For instance, in some embodiments, the notification could be a mild alert for a low level of risk below a predetermined first threshold level, a medium alert for a medium level of risk above the predetermined first threshold level but below a predetermined second threshold level, or an aggressive alert for a high level of risk above the second threshold level. In some embodiments, the notification through wearable device on user 312 may be displaying an alert message on a graphical user interface of the wearable device itself. In other embodiments, the notification through wearable device on user 312 may be a transmitted sound on a speaker of the wearable device. In other embodiments, the notification through wearable device on user 312 may be a haptic feedback alert on the wearable device, such as a vibration or a buzzing. In such scenarios, a mild alert may be a single vibration, a medium alert may be a double vibration, and an aggressive alert may be a continuous vibration. Other examples are possible.

Figure 3C:
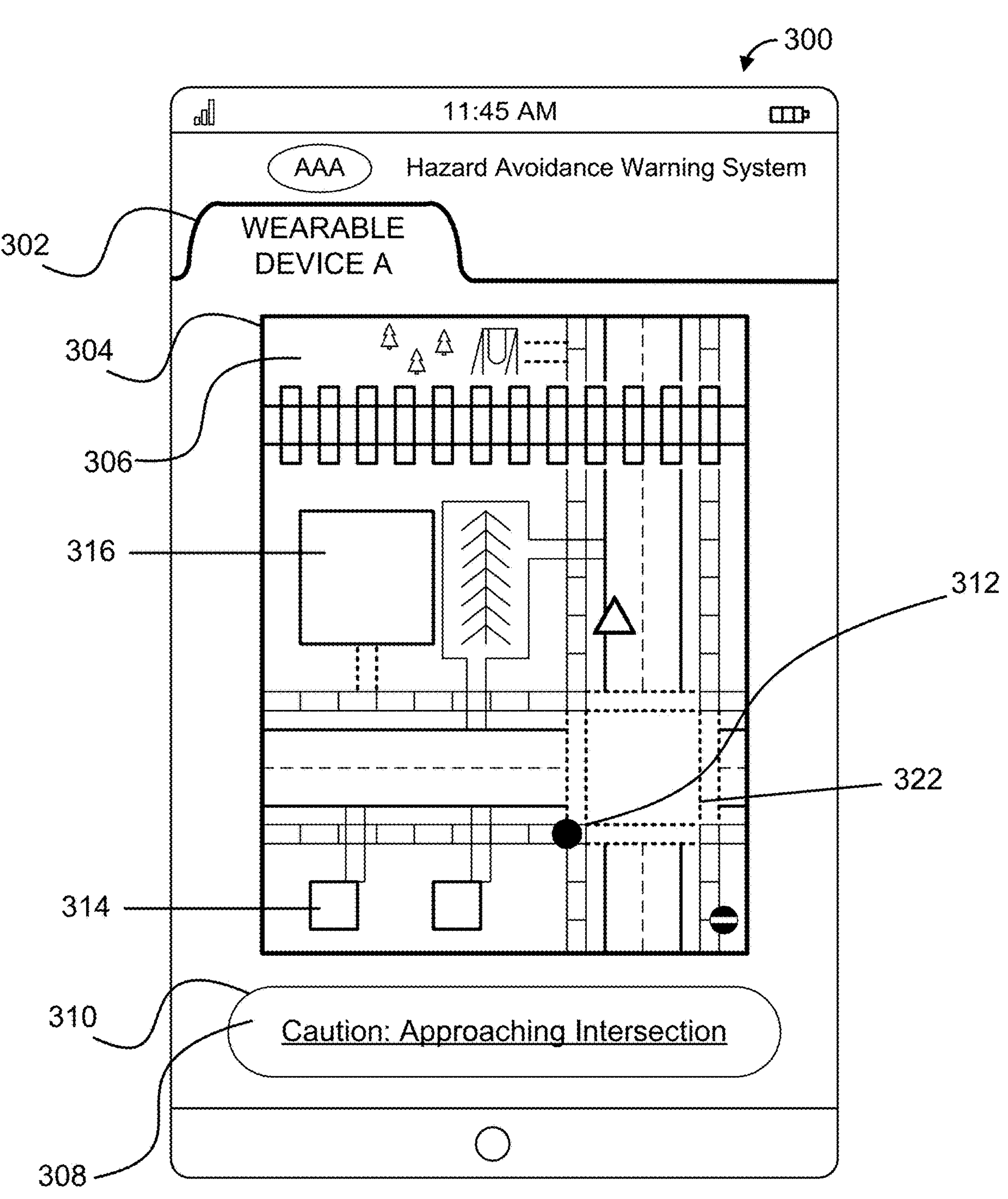
FIG. 3C is the example mobile device of the accident hazard avoidance system and graphical user interface of FIGS. 3A-3B, but in a third state.

Once user 312 passes driveway 318 of neighbor's house 320 and continues down the sidewalk, an updated location of user 312 within the geographic region is displayed on graphical user interface 300. For instance, as shown in FIG. 3C, user 312 approaches intersection 322. Graphical user interface 300 again displays an alert condition to the parent on the mobile computing device. For instance, user 312 approaching intersection 322 may be associated with a medium level of risk, and the alert condition shown as message 308 in notification display region 310 of graphical user interface reads "Caution: Approaching Intersection." User 312 may also receive a notification associated with a medium level of risk through wearable device.

Figure 3D:
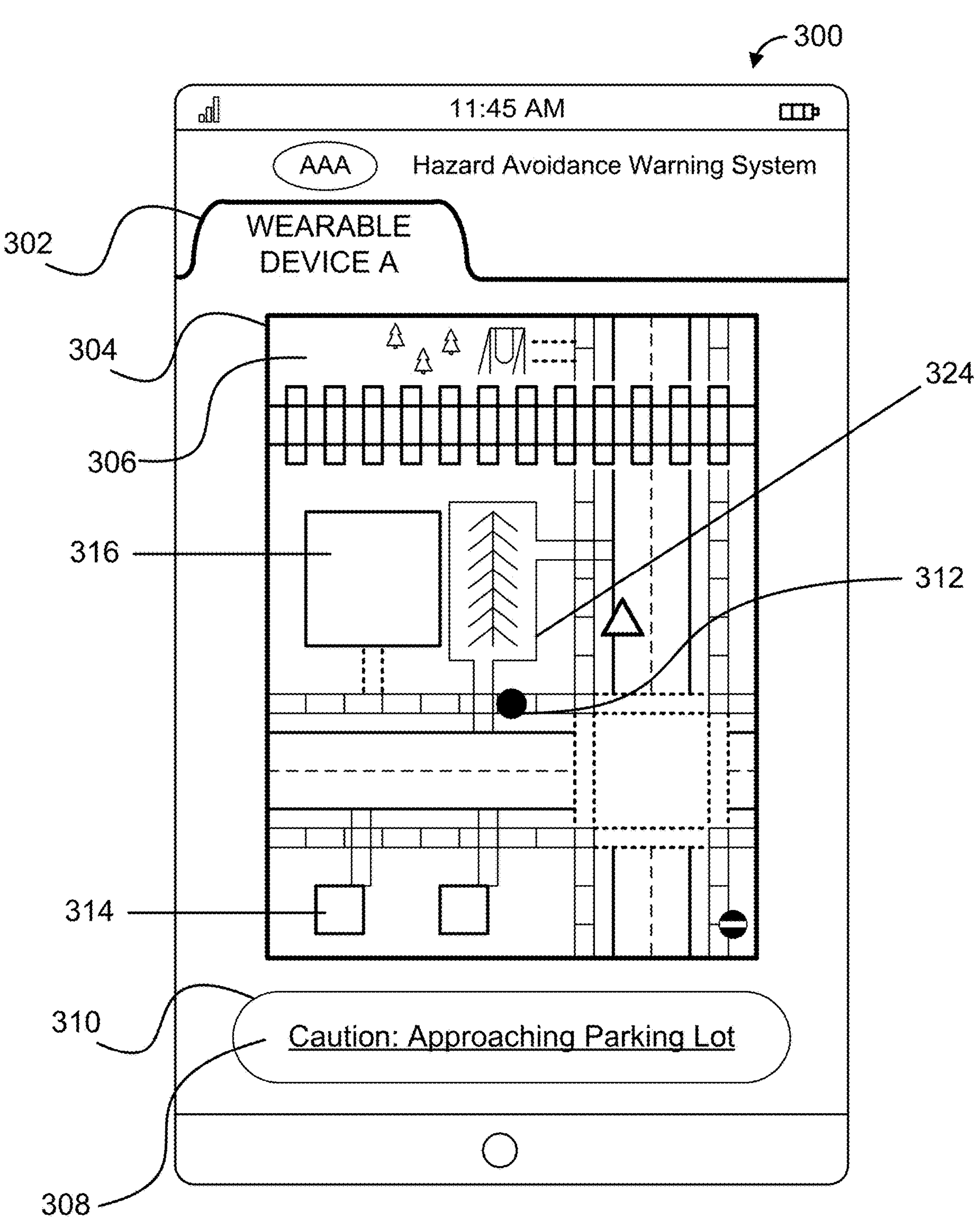
FIG. 3D is the example mobile device of the accident hazard avoidance system and graphical user interface of FIGS. 3A-3C, but in a fourth state.

After user 312 safely crosses intersection 322 and continues walking on the opposing side of the street towards the school, user 312 must a cross parking lot entrance 324 of the second location 316. As shown in FIG. 3D, graphical user interface 300 again displays an alert condition to the parent on the mobile computing device. For instance, user 312 approaching parking lot entrance 324 of the second location 316 may be associated with a medium level of risk, and the alert condition shown as message 308 in notification display region 310 of graphical user interface reads "Caution: Approaching Parking Lot." User 312 may also receive a notification associated with a medium level of risk through wearable device.

Figure 3E:
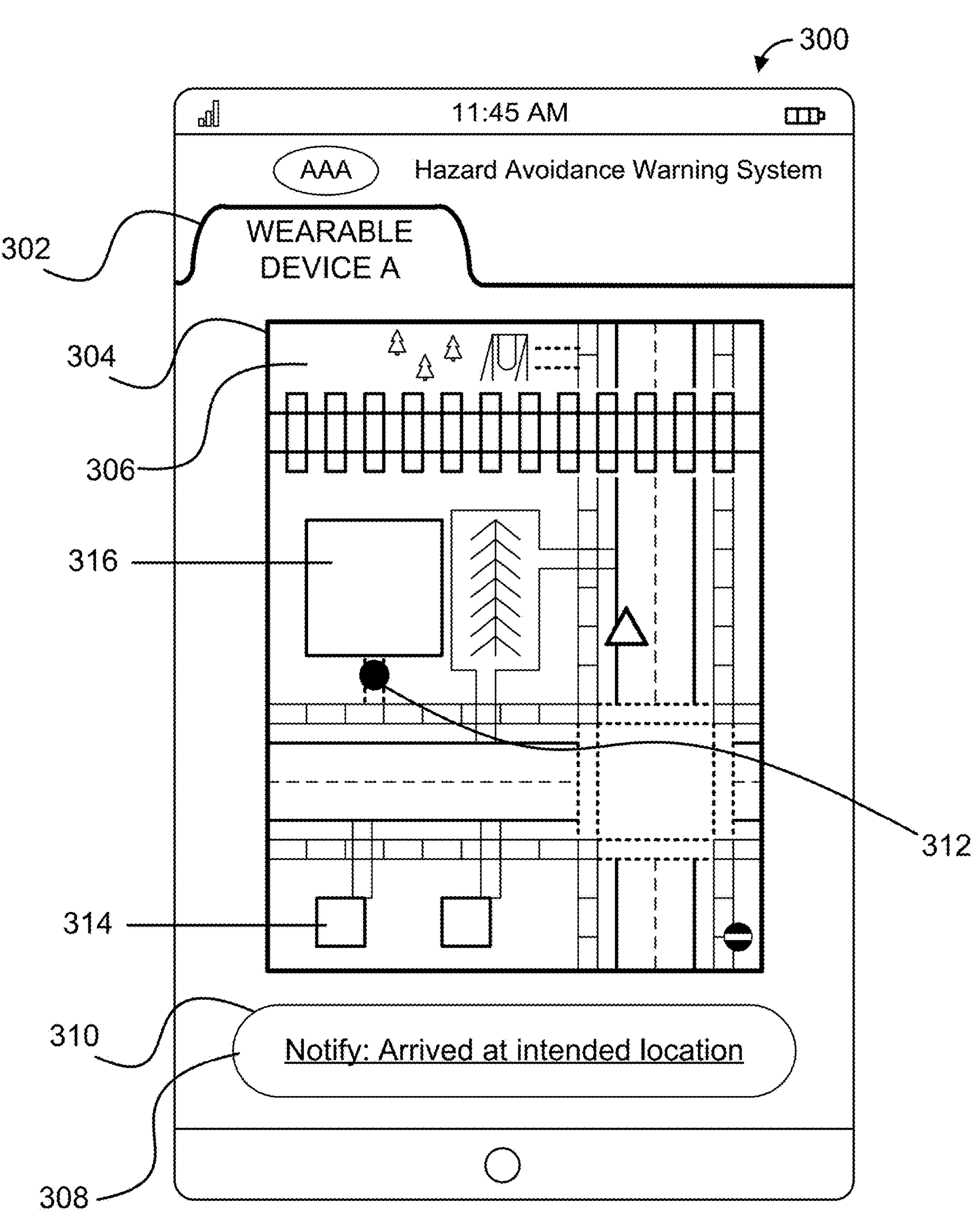
FIG. 3E is the example mobile device of the accident hazard avoidance system and graphical user interface of FIGS. 3A-3D, but in a fifth state.

Once user 312 passes parking lot entrance 324 of the second location 316 and continues to the second location 316, an updated location of user 312 within the geographic region is displayed on graphical user interface 300. For instance, as shown in FIG. 3E, user 312 safely arrives at the second location 316. Graphical user interface 300 again displays an alert condition to the parent on the mobile computing device. For instance, user 312 safely arriving at the second location 316 may be associated with a low level of risk, and the alert condition shown as message 308 in notification display region 310 of graphical user interface reads “Notify: Arrived at intended location.” User 312 may also receive a notification associated with a low level of risk through wearable device. If user 312 follows the intended path, such as is shown in FIGS. 3A-3E, the hazard avoidance warning system would stop there.

However, if user 312 does not follow the intended path, the hazard avoidance warning system may display alternative warnings and notifications. Examples of these actions by user 312 are displayed in FIGS. 3F-3K. Other examples are also possible.

Figure 3F:
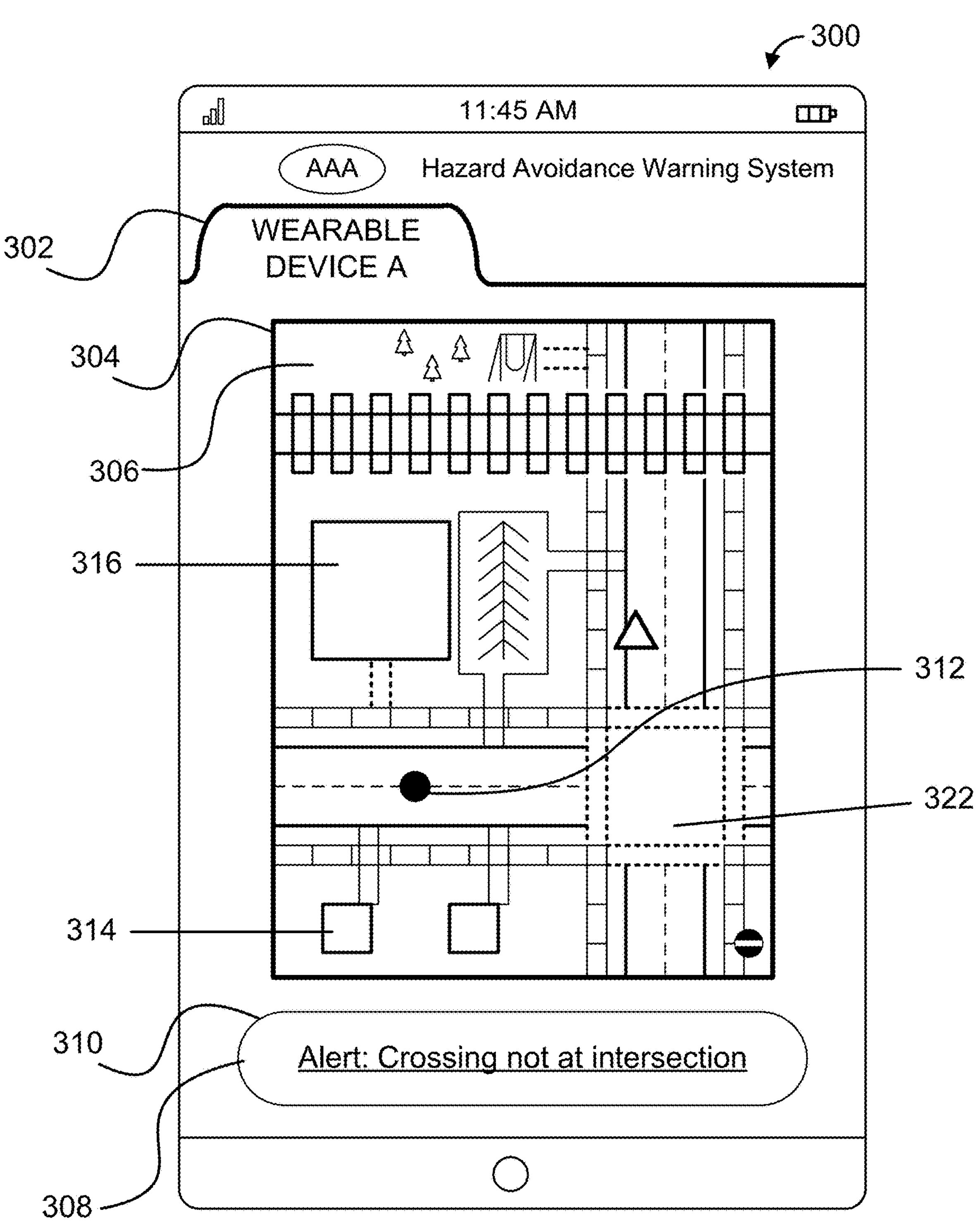
FIG. 3F is the example mobile device of the accident hazard avoidance system and graphical user interface of FIGS. 3A-3E, but in a sixth state.

For instance, FIG. 3F shows an example of user 312 attempting to cross the street from the user’s first location 314 to the second location 316 in the middle of the street instead of at an intersection designed for safer crossing, such as intersection 322. For instance, user 312 crossing a street without being within an appropriate crossing zone may be associated with a high level of risk, and the alert condition shown as message 308 in notification display region 310 of graphical user interface reads “Alert: Crossing not at intersection.” This would allow the parent of user 312 to become aware of the high level of risk user 312 has entered into. User 312 may also receive a notification associated with a high level of risk through wearable device.

Figure 3G:
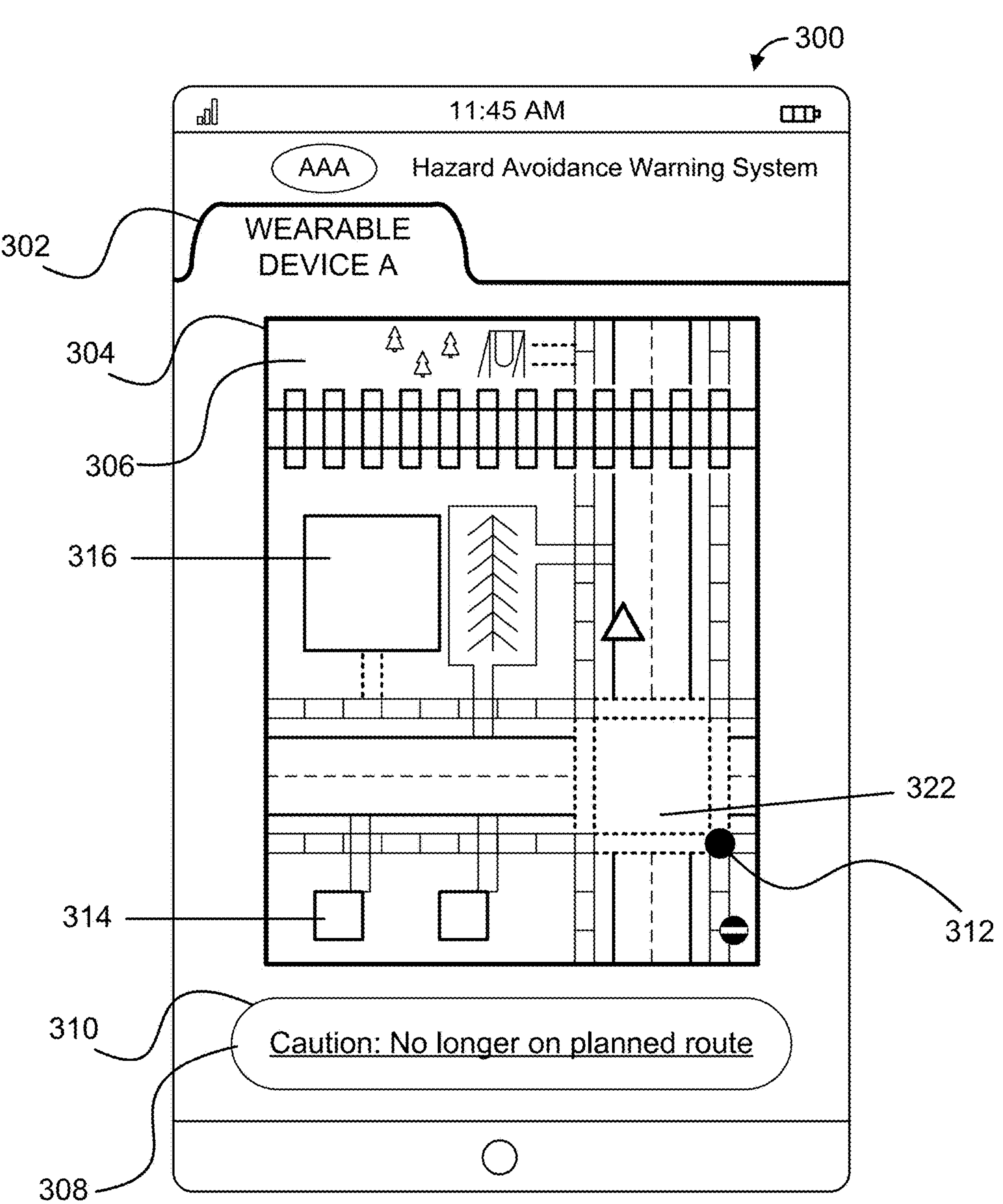
FIG. 3G is the example mobile device of the accident hazard avoidance system and graphical user interface of FIGS. 3A-3F, but in a seventh state.
Figure 3H:
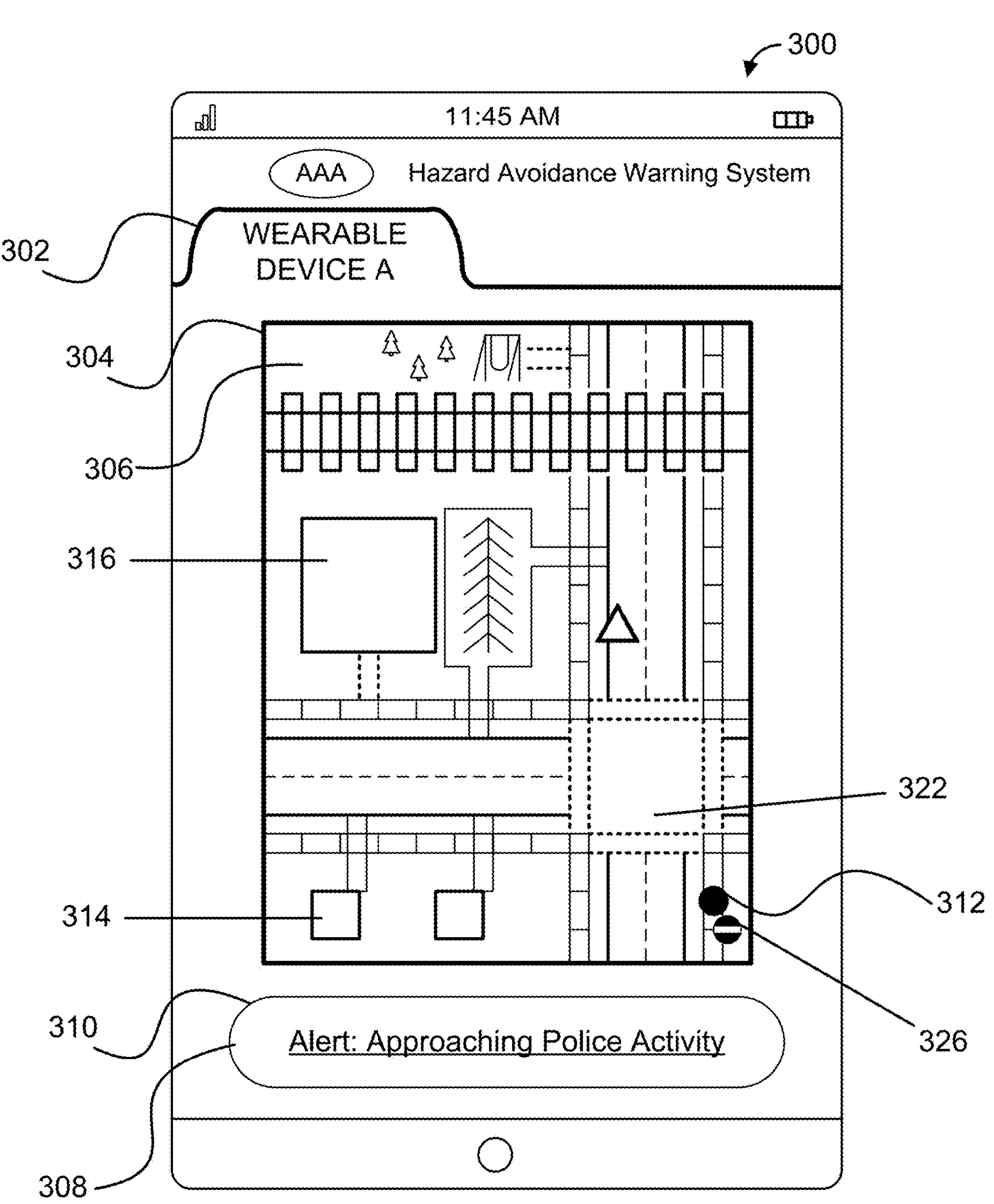
FIG. 3H is the example mobile device of the accident hazard avoidance system and graphical user interface of FIGS. 3A-3G, but in an eighth state.

In another example, FIGS. 3G-3H show an example of user 312 crossing the street at intersection 322 in a wrong direction. As shown in FIG. 3G, user 312 crossing at intersection 322 in a wrong direction may be associated with a medium level of risk, and the alert condition shown as message 308 in notification display region 310 of graphical user interface reads “Caution: No longer on planned route.” User 312 may also receive a notification associated with a medium level of risk through wearable device. However, if the user wearing the wearable device continues to move in a wrong direction, further notifications may be sent. For instance, of user 312 continues in the wrong direction, such as is shown in FIG. 3H, user 312 may encounter another hazard, such as the environmentally-disclosed hazard of police activity 326, that may be associated with a high level of risk. The alert condition shown as message 308 in notification display region 310 of graphical user interface reads “Alert: Approaching Police Activity.” User 312 may also receive a notification associated with a high level of risk through wearable device.

In some embodiments, this type of risk may also trigger other/alternative responses. For instance, the notification by wearable device for user 312 may respond with a different type of feedback for user 312 because this situation may be one in which it would be safer to not draw attention to user 312, such as through flashing lights or loud auditory signals. Instead, wearable device may be programmed to alert user 312 of the impending hazard in a more private way. In addition, while a notification to parent of user 312 through graphical user interface 300 on their mobile computing device may be notified, this type of hazard may be sent to other authorized users of other mobile computing devices in the geographic region associated with user 312. For instance, if a neighbor or other family member of user 312 is authorized to receive notifications of user 312, it would be advantageous for any authorized user closest to user 312 to be notified of such types of dangers. Therefore, the authorized adult who can get to user 312 the fastest is appropriately notified, such as if a neighbor is closer to the user 312 than the parent when the alert condition is detected.

Figure 3I:
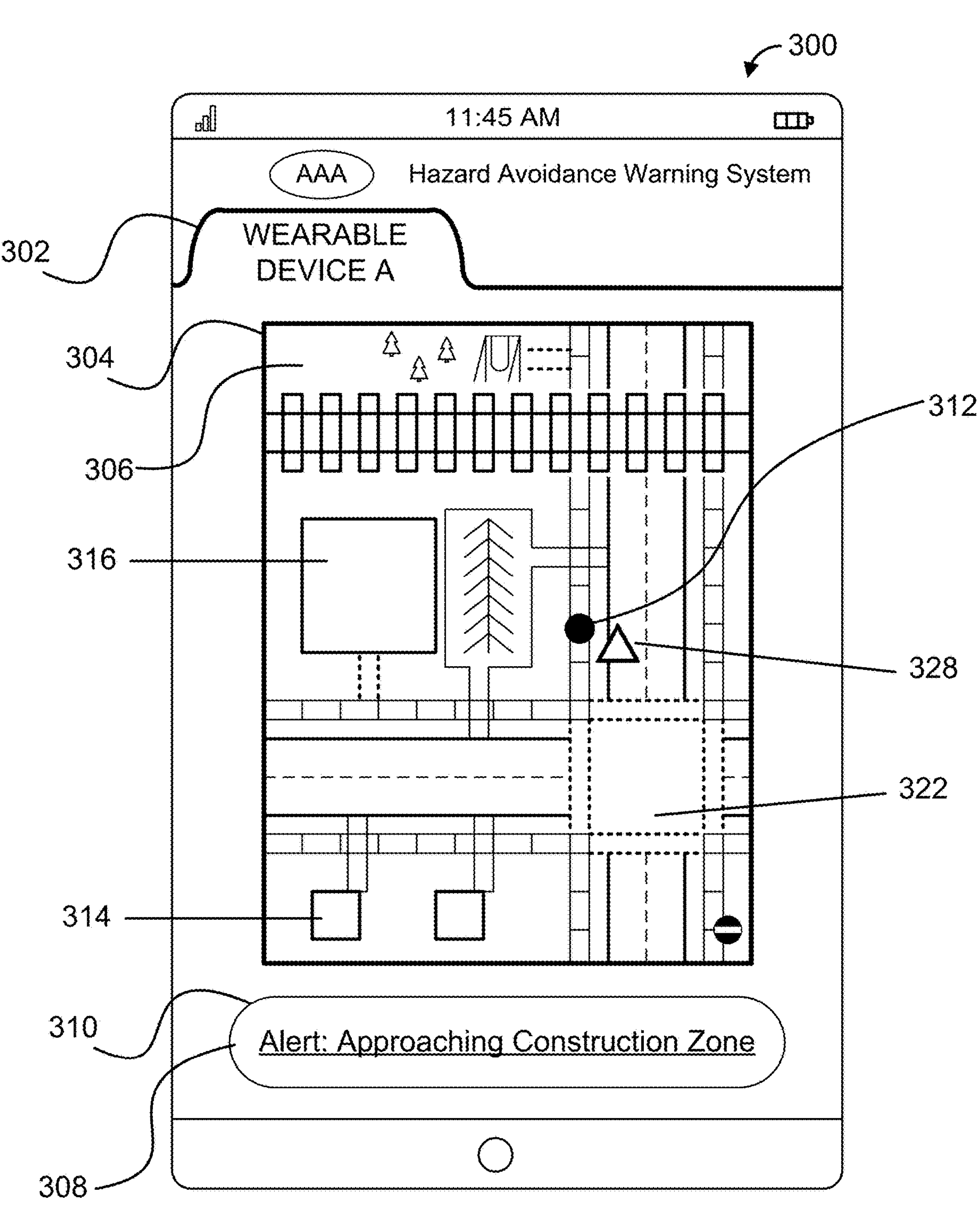
FIG. 3I is the example mobile device of the accident hazard avoidance system and graphical user interface of FIGS. 3A-3H, but in a ninth state.
Figure 3J:
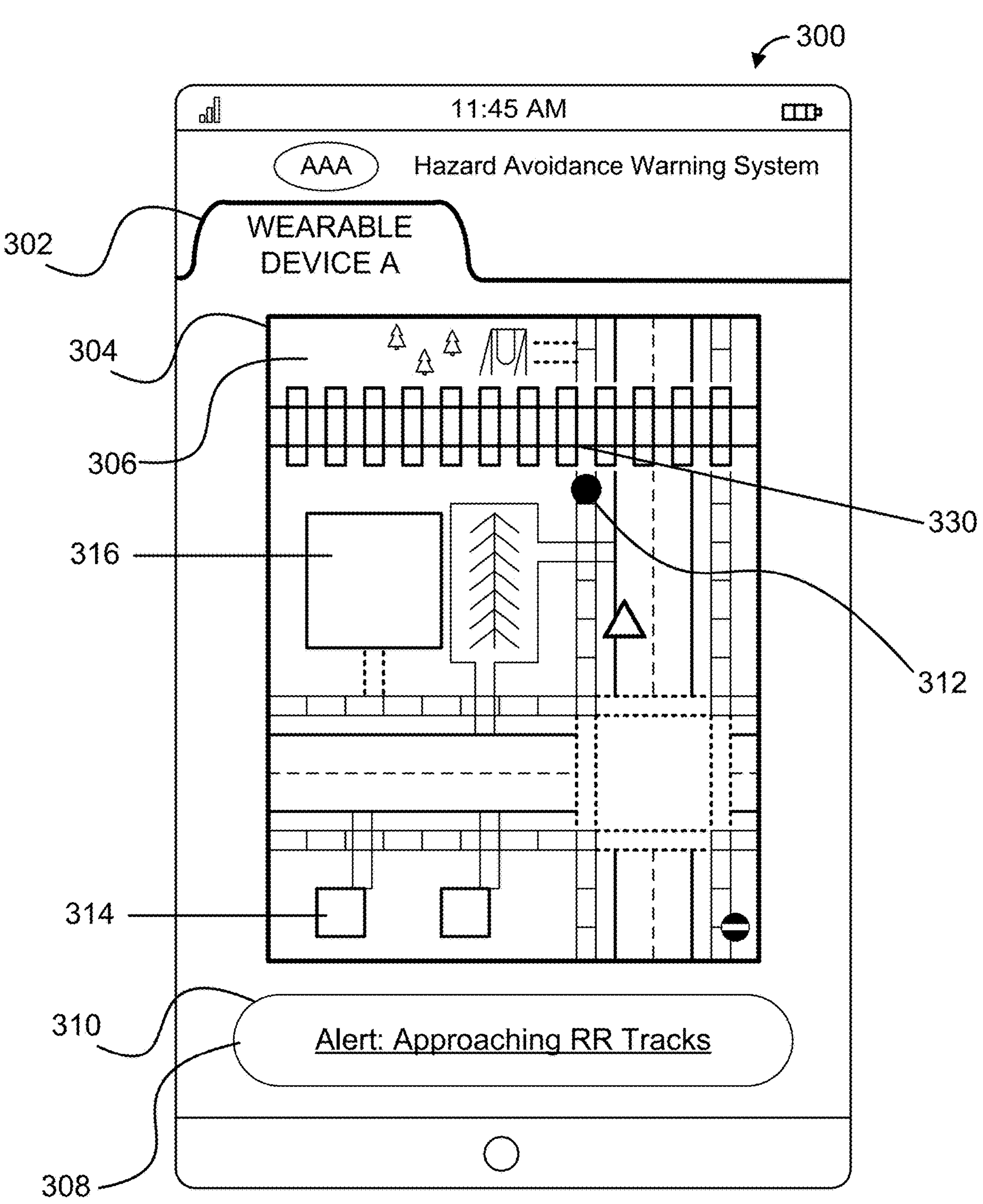
FIG. 3J is the example mobile device of the accident hazard avoidance system and graphical user interface of FIGS. 3A-3I, but in a tenth state.
Figure 3K:
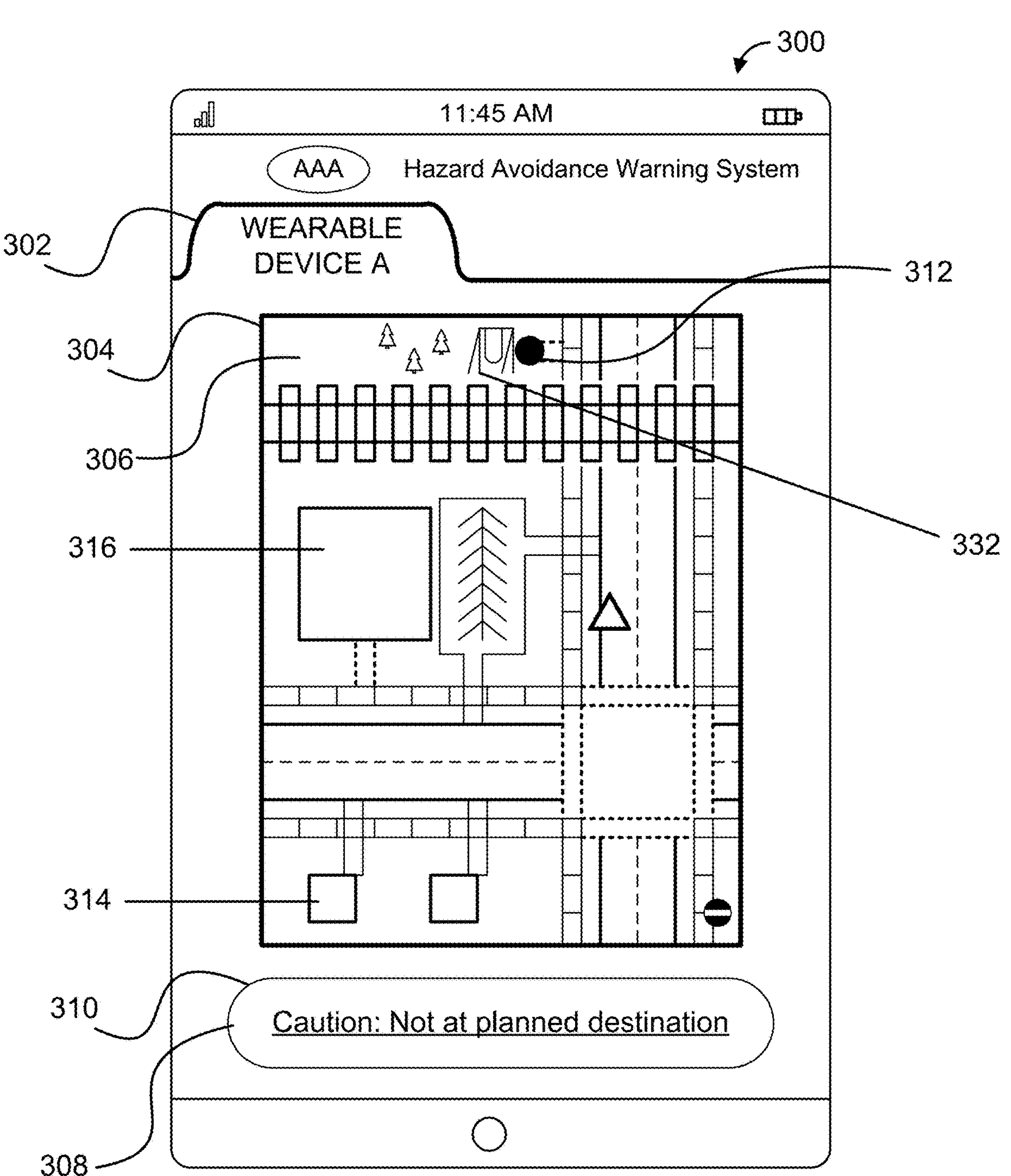
FIG. 3K is the example mobile device of the accident hazard avoidance system and graphical user interface of FIGS. 3A-3J, but in an eleventh state.

In another example, FIGS. 3I-3K show an example of user 312 crossing the street at intersection 322 and continuing along the sidewalk in a wrong direction. As shown in FIG. 3I, user 312 continuing in a wrong direction, such as is shown in FIG. 3I, user 312 may encounter another hazard, such as the environmentally-disclosed hazard of construction zone 328, that may be associated with a high level of risk. The alert condition shown as message 308 in notification display region 310 of graphical user interface reads “Alert: Approaching Construction Zone.” User 312 may also receive a notification associated with a high level of risk through wearable device. As the user 312 continues in the wrong direction, such as is shown in FIG. 3J, user 312 may encounter another hazard, such as the railroad crossing 330, that may be associated with a high level of risk. The alert condition shown as message 308 in notification display region 310 of graphical user interface reads “Alert: Approaching RR Tracks.” User 312 may also receive a notification associated with a high level of risk through wearable device. However, if user 312 safely navigates past these hazards and ventures to the playground 332, such as is shown in FIG. 3K, the alert may be associated with a medium level of risk. The alert condition shown as message 308 in notification display region 310 of graphical user interface reads “Caution: Not at planned destination.” User 312 may also receive a notification associated with a medium level of risk through wearable device.

Figure 4:
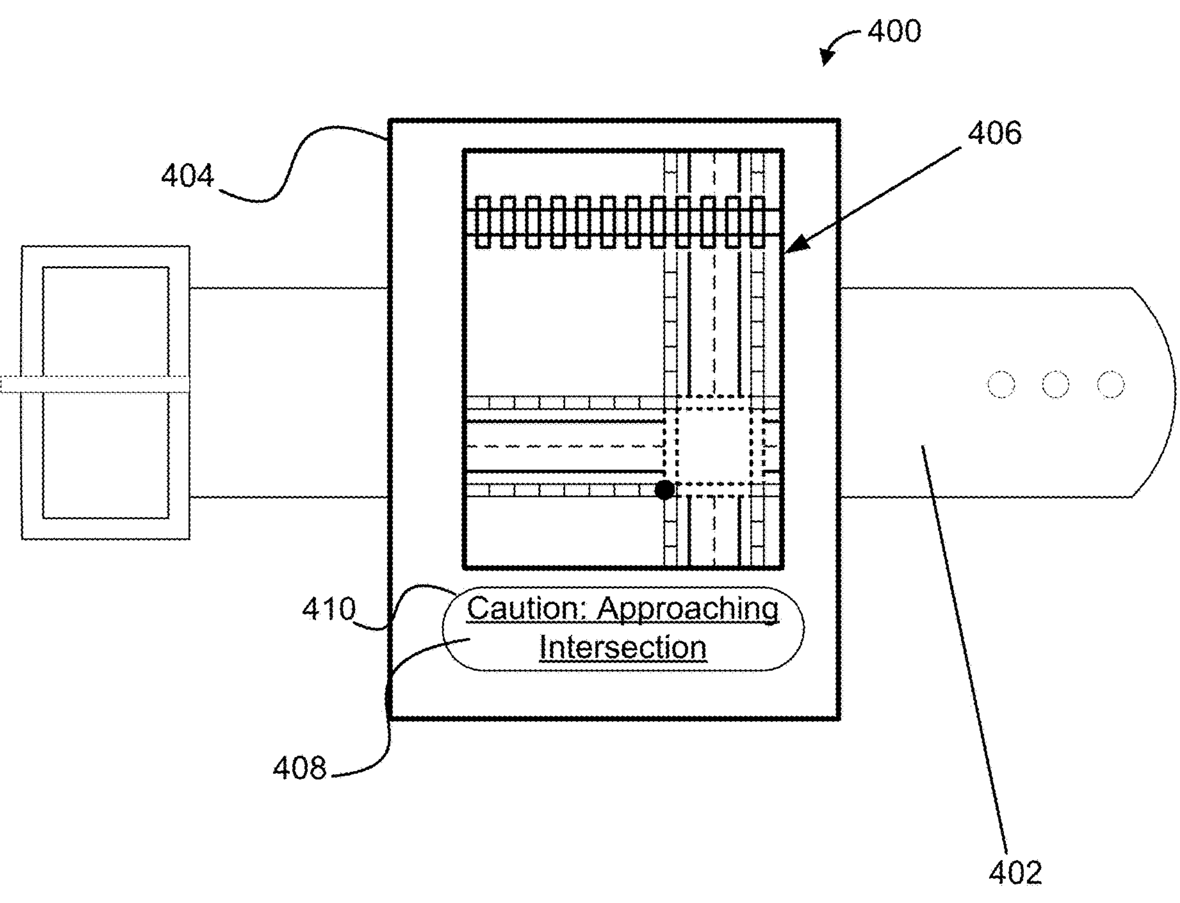
FIG. 4 is an example wearable computing device and graphical user interface.

FIG. 4 illustrates an example wearable device 400. Wearable device 400 may comprise an attaching mechanism 402 and a graphical user interface (GUI) 404.

The attaching mechanism 402 may vary from embodiment to embodiment. In some embodiments, the attaching mechanism 402 may be configured to be worn around a user’s wrist, such as a watchband or a bracelet, as shown in FIG. 4. In other embodiments, the attaching mechanism 402 may be a lanyard or necklace, a keychain, a belt, an anklet, a clip to be clipped on an article of clothing, or the like.

In a further aspect, although wearable device 400 is illustrated as a wristwatch computing device (e.g., an Apple Watch®) in FIG. 4, wearable device 400 may be any computing device that is capable of being worn by a user (e.g., tablet, mobile phone, etc.), including via one or more of the example attaching mechanisms 402 discussed above. Other examples are possible.

In examples, GUI 404 may include any feature of the example GUI in FIG. 3, or any other available GUI feature. In some embodiments, GUI 404 may display varying levels of information, depending on the nature of the functionality and/or the age or sophistication of the user/wearer. For example, if the wearer of the wearable device 400 is a young child (e.g., five years old, just starting kindergarten), the displayed information and/or message may be relatively simple.

If a further aspect, in example embodiments, other functionalities of the wearable device 400 may be employed depending on the age and/or sophistication of the wearer/user. For example, if the wearer of the wearable device 400 is a young child without a sufficient reading level to read a sophisticated displayed message (e.g., five years old, just starting kindergarten), other means may be employed to help ensure the child’s safety, including other audio, visual, and/or haptic feedback to relay a message to the child (e.g., an audio message that instructs the wearer: “DO NOT CROSS THE STREET”, perhaps in combination with a recurrent haptic feedback). In this regard, GUI 404, wearable device 400, and/or both may be configured to dynamically adapt functionality to provide messages and/or feedback to the wearer/user based on one or more attributes of the wearer/user (e.g., age, nationality, reading level, etc.) Other examples are possible.

In other embodiments, GUI 404 may include every feature available on any other GUI. For instance, in some embodiments, GUI 404 may include map 406, which may or may not include one or more identified hazardous conditions within the geographic region based on received geographic region data and/or collected environmental data. Further, in some embodiments, GUI 404 may also include a notification display region 410 for displaying one or more messages 408 to the user of the wearable device for hazard avoidance. For example, in FIG. 4, the alert condition shown as message 408 in notification display region 410 of GUI 404 reads "Caution: Approaching Intersection." The alert condition shown as message 408 indicates the condition to the user of the wearable device in real time or near real time. In other embodiments, other types of alert conditions are possible.

GUI 404 can also include hardware and/or software components that facilitate interaction between wearable device 400 and a network, such as network 202 in FIGS. 2A and 2B. As such, in example embodiments, GUI 404 can include and/or interact with input and/or output components such as a display device (which, for example, can be combined with a touch-sensitive panel), a sound speaker, and/or a haptic feedback system.

III. Example Method of Operation

Figure 5:
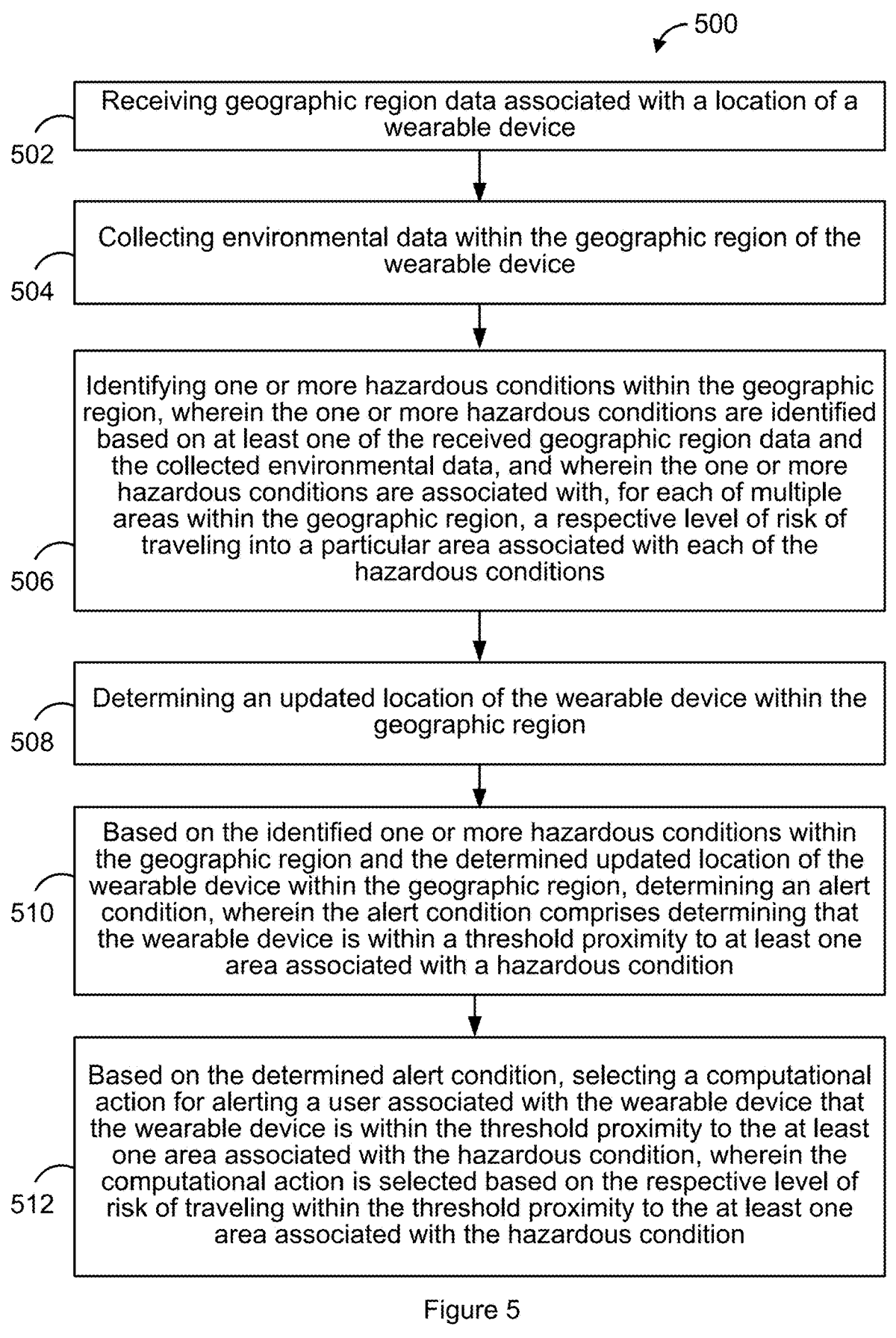

FIG. 5 illustrates a block diagram of method 500 for hazard avoidance.

At block 502, method 500 includes receiving geographic region data associated with a location of a wearable device. In some example embodiments, the geographic region data comprises one or more of: (i) map data; (ii) weather data; (iii) accident data; (iv) emergency data; and (v) traffic data.

At block 504, method 500 includes collecting environmental data within the geographic region of the wearable device. In some examples, the method comprises using at least one sensor to collect environmental data. In some examples, the at least one sensor comprises one or more of the following sensors: (i) GPS sensor; (ii) accelerometer sensor; (iii) weather sensor; (iv) biometric sensor; (v) camera sensor; (vi) heartrate sensor; (vii) oxygen sensor; and (viii) sound detection sensor. In some example embodiments, the environmental data comprises one or more of the following: (i) location data; (ii) weather data; (iii) accident data; (iv) emergency data; and (v) health data.

At block 506, method 500 includes identifying one or more hazardous conditions within the geographic region. In some embodiments, the one or more hazardous conditions are identified based on at least one of the received geographic region data and the collected environmental data. In some embodiments, the one or more hazardous conditions are associated with, for each of multiple areas within the geographic region, a respective level of risk of traveling into a particular area associated with each of the hazardous conditions.

At block 508, method 500 includes determining an updated location of the wearable device within the geographic region.

At block 510, method 500 includes determining an alert condition. In some embodiments, the alert condition comprises determining that the wearable device is within a threshold proximity to at least one area associated with a hazardous condition. Further, in some embodiments, determining an alert condition may be based on the identified one or more hazardous conditions within the geographic region and the determined updated location of the wearable device within the geographic region. In some examples, the selected computational action comprises displaying an alert message on a graphical user interface of the wearable device. In some examples, the selected computational action comprises transmitting an alert sound on a speaker of the wearable device. In some examples, the selected computational action comprises transmitting a haptic feedback alert on the wearable device. In some examples, when user of the wearable device is remote from the wearable device, the selected computational action comprises transmitting an instruction that causes a computing device associated with the user to display an alert message on a graphical user interface of the computing device. In some examples, when user of the wearable device is remote from the wearable device, the selected computational action comprises transmitting an instruction that causes a computing device associated with the user to transmit an alert sound on a speaker of the computing device. In some examples, when user of the wearable device is remote from the wearable device, the selected computational action comprises transmitting an instruction that causes a computing device associated with the user to transmit a haptic feedback alert on the computing device. In some examples, when user of the wearable device is remote from the wearable device, the selected computational action comprises transmitting an emergency message to at least one emergency service that is remote from the wearable device to provide emergency services to a user associated with the wearable device. In some examples, determining the alert condition further comprises determining that the wearable device is outside of a threshold proximity of a predetermined area associated with the wearable device. In some embodiments, determining the alert condition further comprises determining that the wearable device is outside of a threshold proximity of a predetermined route associated with the wearable device.

At block 512, method 500 includes selecting a computational action for alerting a user associated with the wearable device that the wearable device is within the threshold proximity to the at least one area associated with the hazardous condition. In some embodiments, the computational action is selected based on the respective level of risk of traveling within the threshold proximity to the at least one area associated with the hazardous condition. Further, in some embodiments selecting a computational action for alerting a user associated with the wearable device that the wearable device is within the threshold proximity to the at least one area associated with the hazardous condition may be based on the determined alert condition.

In some embodiments, method 500 further includes geographic region data that comprises one or more of: (i) map data; (ii) weather data; (iii) accident data; (iv) emergency data; and (v) traffic data. In other embodiments, method 500 further includes a wearable device that comprises at least one sensor to collect environmental data. In some embodiments, method 500 further includes the at least one sensor that comprises one or more of the following sensors: (i) GPS sensor; (ii) accelerometer sensor; (iii) weather sensor; (iv) biometric sensor; (v) camera sensor; (vi) heartrate sensor; (vii) oxygen sensor; and (viii) sound detection sensor. In other embodiments, method 500 further includes environmental data that comprises one or more of the following: (i) location data; (ii) weather data; (iii) accident data; (iv) emergency data; and (v) health data.

What is claimed:

1. A wearable device for hazard avoidance, the wearable device comprising:

a processor; and a non-transitory computer-readable medium, having stored thereon program instructions that, upon execution by the processor, cause the wearable device to perform a set of operations comprising:

receiving geographic region data from a GPS sensor associated with a location of the wearable device;

collecting environmental data from one or more sensors within the geographic region of the wearable device;

identifying one or more hazardous conditions within the geographic region, wherein the one or more hazardous conditions are identified based on at least one of the received geographic region data and the collected environmental data, and wherein the one or more hazardous conditions are associated with, for each of multiple areas within the geographic region, a respective level of risk of traveling into a particular area associated with each of the hazardous conditions;

determining an updated location of the wearable device within the geographic region;

based on the identified one or more hazardous conditions within the geographic region and the determined updated location of the wearable device within the geographic region, determining an alert condition, wherein determining the alert condition comprises determining that the wearable device is within a threshold proximity to at least one area associated with a hazardous condition; and based on the determined alert condition, selecting a computational action for alerting a user associated with a wearer of the wearable device that the wearable device is within the threshold proximity to the at least one area associated with the hazardous condition, wherein the user is remote from the wearer, and wherein the computational action is selected based on the respective level of risk of traveling within the threshold proximity to the at least one area associated with the hazardous condition, and wherein the computational action comprises transmitting an instruction that causes a computing device associated with the user to transmit an alert.

2. The wearable device of claim 1, wherein the geographic region data further comprises one or more of: (i) map data; (ii) weather data; (iii) accident data; (iv) emergency data; and (v) traffic data.

3. The wearable device of claim 1, wherein the wearable device comprises at least one sensor to collect environmental data.

4. The wearable device of claim 3, wherein the at least one sensor comprises one or more of the following sensors: (i) GPS sensor; (ii) accelerometer sensor; (iii) weather sensor; (iv) biometric sensor; (v) camera sensor; (vi) heartrate sensor; (vii) oxygen sensor; and (viii) sound detection sensor.

5. The wearable device of claim 4, wherein the environmental data comprises one or more of the following: (i) location data; (ii) weather data; (iii) accident data; (iv) emergency data; and (v) health data.

6. The wearable device of claim 1, wherein the selected computational action further comprises displaying an alert message on a graphical user interface of the wearable device.

7. The wearable device of claim 1, wherein the selected computational action further comprises transmitting an alert sound on a speaker of the wearable device.

8. The wearable device of claim 1, wherein the selected computational action further comprises transmitting a haptic feedback alert on the wearable device.

9. The wearable device of claim 1, wherein the alert comprises a display an alert message on a graphical user interface of the computing device.

10. The wearable device of claim 1, wherein the alert comprises an alert sound on a speaker of the computing device.

11. The wearable device of claim 1, wherein the alert comprises a haptic feedback alert on the computing device.

12. The wearable device of claim 1, wherein the selected computational action further comprises transmitting an emergency message to at least one emergency service that is remote from the wearable device to provide emergency services to the wearer of the wearable device.

13. The wearable device of claim 1, wherein determining the alert condition further comprises determining that the wearable device is outside of a threshold proximity of a predetermined area associated with the wearable device.

14. The wearable device of claim 1, wherein determining the alert condition further comprises determining that the wearable device is outside of a threshold proximity of a predetermined route associated with the wearable device.

15. A method for hazard avoidance, the method comprising:

receiving geographic region data from a GPS sensor associated with a location of a wearable device;

collecting environmental data from one or more sensors within the geographic region of the wearable device;

identifying one or more hazardous conditions within the geographic region, wherein the one or more hazardous conditions are identified based on at least one of the received geographic region data and the collected environmental data, and wherein the one or more hazardous conditions are associated with, for each of multiple areas within the geographic region, a respective level of risk of traveling into a particular area associated with each of the hazardous conditions;

determining an updated location of the wearable device within the geographic region;

based on the identified one or more hazardous conditions within the geographic region and the determined updated location of the wearable device within the geographic region, determining an alert condition, wherein determining the alert condition comprises determining that the wearable device is within a threshold proximity to at least one area associated with a hazardous condition; and based on the determined alert condition, selecting a computational action for alerting a user associated with a wearer of the wearable device that the wearable device is within the threshold proximity to the at least one area associated with the hazardous condition, wherein the user is remote from the wearer, and wherein the computational action is selected based on the respective level of risk of traveling within the threshold proximity to the at least one area associated with the hazardous condition, and wherein the computational action comprises transmitting an instruction that causes a computing device associated with the user to transmit an alert.

16. The method of claim 15, wherein the geographic region data further comprises one or more of: (i) map data; (ii) weather data; (iii) accident data; (iv) emergency data; and (v) traffic data.

17. The method of claim 15, wherein the wearable device comprises at least one sensor to collect environmental data.

18. The method of claim 17, wherein the at least one sensor comprises one or more of the following sensors: (i) GPS sensor; (ii) accelerometer sensor; (iii) weather sensor; (iv) biometric sensor; (v) camera sensor; (vi) heartrate sensor; (vii) oxygen sensor; and (viii) sound detection sensor.

19. The method of claim 18, wherein the environmental data comprises one or more of the following: (i) location data; (ii) weather data; (iii) accident data; (iv) emergency data; and (v) health data.

20. A system for hazard avoidance, the system comprising:

a first computing device comprising:

a sensor;

a network interface;

a processor; and a non-transitory computer-readable medium, having stored thereon program instructions that, upon execution by the processor, cause the first computing device to perform a set of operations comprising:

receiving, via the network interface, geographic region data associated from a GPS sensor with a location of the first computing device;

collecting, via the sensor, environmental data within the geographic region of the first computing device;

identifying one or more hazardous conditions within the geographic region, wherein the one or more hazardous conditions are identified based on at least one of the received geographic region data and the collected environmental data, and wherein the one or more hazardous conditions are associated with, for each of multiple areas within the geographic region, a respective level of risk of traveling into a particular area associated with each of the hazardous conditions; and transmitting, via the network interface, data indicating the identified one or more hazardous conditions to a second computing device;

a second computing device comprising:

a processor; and a non-transitory computer-readable medium, having stored thereon program instructions that, upon execution by the processor, cause the first computing device to perform a set of operations comprising:

receiving, from the first computing device, data indicating the identified one or more hazardous conditions;

determining an updated location of the first computing device within the geographic region;

based on the received data indicating the identified one or more hazardous conditions within the geographic region and the determined updated location of the first computing device within the geographic region, determining an alert condition, wherein determining the alert condition comprises determining that the first computing device is within a threshold proximity to at least one area associated with a hazardous condition; and based on the determined alert condition, selecting a computational action for alerting a user associated with a wearer of the first computing device that the first computing device is within the threshold proximity to the at least one area associated with the hazardous condition, wherein the user is remote from the wearer, and wherein the computational action is selected based on the respective level of risk of traveling within the threshold proximity to the at least one area associated with the hazardous condition, and wherein the computational action comprises transmitting an instruction that causes the first computing device to transmit an alert.

* * * * *